United States Patent
Eenigenburg et al.

(10) Patent No.: US 10,443,251 B2
(45) Date of Patent: Oct. 15, 2019

(54) WHEELED CONCRETE SUPPLY HOSE MOVING DEVICE

(71) Applicant: SOMERO ENTERPRISES, INC., Fort Myers, FL (US)

(72) Inventors: Trevor Eenigenburg, Houghton, MI (US); Ryan Kangas, Calumet, MI (US)

(73) Assignee: SOMERO ENTERPRISES, INC., Fort Myers, FL (US)

( * ) Notice: Subject to any disclaimer, the term of this patent is extended or adjusted under 35 U.S.C. 154(b) by 76 days.

(21) Appl. No.: 15/787,837

(22) Filed: Oct. 19, 2017

(65) Prior Publication Data

US 2018/0106056 A1    Apr. 19, 2018

Related U.S. Application Data

(60) Provisional application No. 62/410,093, filed on Oct. 19, 2016.

(51) Int. Cl.
*E04G 21/04* (2006.01)
*B66C 19/00* (2006.01)
*B66C 1/42* (2006.01)

(52) U.S. Cl.
CPC .......... *E04G 21/0436* (2013.01); *B66C 1/427* (2013.01); *B66C 19/005* (2013.01); *Y10T 137/6881* (2015.04)

(58) Field of Classification Search
CPC ... B66C 1/427; B66C 19/005; E04G 21/0436; Y10T 137/6881
USPC .......................................................... 137/615
See application file for complete search history.

(56) References Cited

U.S. PATENT DOCUMENTS

| | | | |
|---|---|---|---|
| 1,695,202 A | 12/1928 | Newell |
| 2,009,542 A | 7/1935 | Day |
| 2,032,205 A | 2/1936 | Gage |
| 2,219,246 A | 10/1940 | Jackson |

(Continued)

FOREIGN PATENT DOCUMENTS

| | | |
|---|---|---|
| CH | 673882 A5 | 4/1990 |
| DE | 3710296 A1 | 10/1988 |

(Continued)

OTHER PUBLICATIONS

International Search Report and Written Opinion dated Feb. 16, 2018, from corresponding PCT patent application PCT/IB2017/056499.

*Primary Examiner* — Kevin L Lee
(74) *Attorney, Agent, or Firm* — Honigman LLP

(57) ABSTRACT

A wheeled hose moving device that is movable over a support surface and that is operable to grasp, lift and move a concrete supply hose at the support surface. The device includes a wheeled support including a hose grasping device and at least one hose support element. The hose grasping device includes a pair of grasping arms configured to grasp and release a concrete supply hose. The hose grasping device is vertically movable between a raised position and a lowered position. The hose support element includes a pair of support arms that pivot relative to one another. The pair of grasping arms move from their opened state toward their closed state to engage and grasp the concrete supply hose. As the grasping device raises the grasped hose upward, the support arms pivot from their opened state toward their closed state to support the grasped and raised hose.

29 Claims, 22 Drawing Sheets

FOUR WHEEL STEERING

(56) References Cited

U.S. PATENT DOCUMENTS

| | | | |
|---|---|---|---|
| 2,255,343 A | 9/1941 | Baily | |
| 2,303,335 A | 12/1942 | Day | |
| 2,373,828 A | 4/1945 | Harrington | |
| 2,374,912 A | 5/1945 | Barnes | |
| 2,400,321 A | 5/1946 | Troxell | |
| 2,449,851 A | 9/1948 | Jackson | |
| 2,453,510 A | 11/1948 | Jackson | |
| 2,583,075 A | 1/1952 | Anderson et al. | |
| 2,599,330 A | 6/1952 | Jackson | |
| 2,796,685 A | 6/1957 | Bensinger | |
| 2,916,836 A | 12/1959 | Stewart et al. | |
| 2,948,513 A | 8/1960 | Krohn-Holm | |
| 2,959,310 A * | 11/1960 | Meister, Jr. | B60P 3/41 414/459 |
| 3,088,384 A | 5/1963 | Heer et al. | |
| 3,089,727 A | 5/1963 | Hay | |
| 3,147,678 A | 9/1964 | Lewis | |
| 3,180,628 A | 4/1965 | Pullin | |
| 3,198,541 A | 8/1965 | Christenson et al. | |
| 3,245,712 A | 4/1966 | Mitchell | |
| 3,262,378 A | 7/1966 | Schrimper et al. | |
| 3,363,930 A | 1/1968 | Webb | |
| 3,390,911 A | 7/1968 | Stilley et al. | |
| 3,396,642 A | 8/1968 | Martinson | |
| 3,403,609 A | 10/1968 | Bradshaw et al. | |
| 3,434,297 A | 3/1969 | Gretter et al. | |
| 3,472,322 A | 10/1969 | Barry | |
| 3,540,360 A | 11/1970 | Snow et al. | |
| 3,604,325 A | 9/1971 | Borges | |
| 3,606,278 A | 9/1971 | Winfrey | |
| 3,721,358 A | 3/1973 | Brock | |
| 3,838,933 A | 10/1974 | Lehman et al. | |
| 3,850,541 A | 11/1974 | Baillet et al. | |
| 3,860,175 A | 1/1975 | Westerlund et al. | |
| 3,870,427 A | 3/1975 | Allen | |
| 3,953,145 A | 4/1976 | Teach | |
| 4,077,731 A | 3/1978 | Holz, Sr. et al. | |
| 4,089,053 A | 5/1978 | Umphrey et al. | |
| 4,109,953 A | 8/1978 | Seymour | |
| 4,159,842 A | 7/1979 | Perkowski | |
| 4,249,327 A | 2/1981 | Allen | |
| 4,263,979 A | 4/1981 | Sturgill | |
| 4,286,914 A | 9/1981 | Davidson, Jr. | |
| 4,299,290 A | 11/1981 | Nunes, Jr. | |
| 4,318,631 A | 3/1982 | Vickers | |
| 4,358,020 A | 11/1982 | Thiele | |
| 4,379,653 A | 4/1983 | Brown | |
| 4,408,978 A | 10/1983 | Owens | |
| 4,427,358 A | 1/1984 | Stilwell | |
| 4,470,783 A | 9/1984 | Friebel et al. | |
| 4,614,486 A | 9/1986 | Bragagnini | |
| 4,655,633 A | 4/1987 | Somero et al. | |
| 4,665,696 A | 5/1987 | Rosman | |
| 4,734,022 A | 3/1988 | Shimabukuro | |
| 4,761,108 A | 8/1988 | Kress et al. | |
| 4,807,131 A | 2/1989 | Clegg | |
| 4,838,730 A | 6/1989 | Owens | |
| 4,930,935 A | 6/1990 | Quenzi et al. | |
| 4,978,246 A | 12/1990 | Quenzi et al. | |
| 5,039,249 A | 8/1991 | Hansen et al. | |
| 5,062,738 A | 11/1991 | Owens | |
| 5,080,525 A | 1/1992 | Bricher et al. | |
| 5,088,874 A | 2/1992 | Quittner | |
| 5,129,803 A | 7/1992 | Nomura et al. | |
| 5,156,487 A | 10/1992 | Haid | |
| 5,180,070 A | 1/1993 | Feider | |
| 5,190,401 A | 3/1993 | Wilson | |
| 5,219,175 A | 6/1993 | Woelfel | |
| 5,224,793 A | 7/1993 | De Pol et al. | |
| 5,258,961 A | 11/1993 | Sehr et al. | |
| 5,279,501 A | 1/1994 | Shelley | |
| 5,288,166 A | 2/1994 | Allen et al. | |
| 5,288,167 A | 2/1994 | Gaffard et al. | |
| 5,328,295 A | 7/1994 | Allen | |
| 5,352,063 A | 10/1994 | Allen et al. | |
| 5,368,434 A | 11/1994 | Kress et al. | |
| 5,375,663 A | 12/1994 | Teach | |
| 5,549,412 A | 8/1996 | Malone | |
| 5,567,075 A | 10/1996 | Allen | |
| 5,588,776 A | 12/1996 | Swisher, Jr. et al. | |
| D385,248 S | 10/1997 | Spiegel | |
| 5,752,783 A | 5/1998 | Malone | |
| 5,771,978 A | 6/1998 | Davidson et al. | |
| 5,778,482 A | 7/1998 | Sbrigato | |
| 5,779,390 A | 7/1998 | Tuusinen | |
| 5,779,623 A | 7/1998 | Bonnell | |
| 5,803,656 A | 9/1998 | Turck | |
| 5,807,022 A | 9/1998 | McCleary | |
| 5,924,819 A | 7/1999 | Breidenbach | |
| 6,022,171 A | 2/2000 | Munoz | |
| 6,029,752 A | 2/2000 | Young | |
| 6,056,474 A | 5/2000 | Nolan | |
| 6,089,787 A | 7/2000 | Allen et al. | |
| 6,129,481 A | 10/2000 | Tapio et al. | |
| 6,152,647 A | 11/2000 | Tapio et al. | |
| 6,174,105 B1 | 1/2001 | Holmes et al. | |
| 6,183,160 B1 | 2/2001 | Tapio et al. | |
| 6,206,127 B1 | 3/2001 | Zakula, Sr. et al. | |
| 6,209,893 B1 | 4/2001 | Ferris | |
| 6,227,761 B1 | 5/2001 | Kieranen et al. | |
| 6,238,135 B1 | 5/2001 | Rower | |
| 6,293,747 B1 * | 9/2001 | Thomas | B66C 1/427 212/326 |
| 6,336,769 B1 | 1/2002 | Cincis et al. | |
| 6,471,191 B1 | 10/2002 | Rotzler et al. | |
| 6,588,976 B2 | 7/2003 | Quenzi et al. | |
| 6,623,208 B2 | 9/2003 | Quenzi et al. | |
| 6,685,390 B1 | 2/2004 | Eitzen | |
| 6,860,676 B2 | 3/2005 | Pont Feixes et al. | |
| 6,953,304 B2 | 10/2005 | Quenzi et al. | |
| 6,976,805 B2 | 12/2005 | Quenzi et al. | |
| 7,044,681 B2 | 5/2006 | Quenzi et al. | |
| 7,121,762 B2 | 10/2006 | Quenzi et al. | |
| 7,195,423 B2 | 3/2007 | Halonen et al. | |
| 8,312,957 B1 | 11/2012 | Stoltzfus | |
| 9,242,410 B2 * | 1/2016 | Lawrence et al. | B29C 65/7841 |
| 2001/0048850 A1 | 12/2001 | Quenzi et al. | |
| 2002/0076279 A1 | 6/2002 | Quenzi et al. | |
| 2005/0247346 A1 | 11/2005 | Pentz | |
| 2007/0090203 A1 | 4/2007 | Quenzi et al. | |
| 2007/0168095 A1 | 7/2007 | Wierzba et al. | |
| 2008/0302923 A1 | 12/2008 | Ruonavaara et al. | |

FOREIGN PATENT DOCUMENTS

| | | |
|---|---|---|
| EP | 0835971 A1 | 4/1998 |
| GB | 1406121 A | 9/1975 |
| JP | 7292974 A | 11/1995 |
| WO | 2007050552 A2 | 5/2007 |

* cited by examiner

FOUR WHEEL STEERING

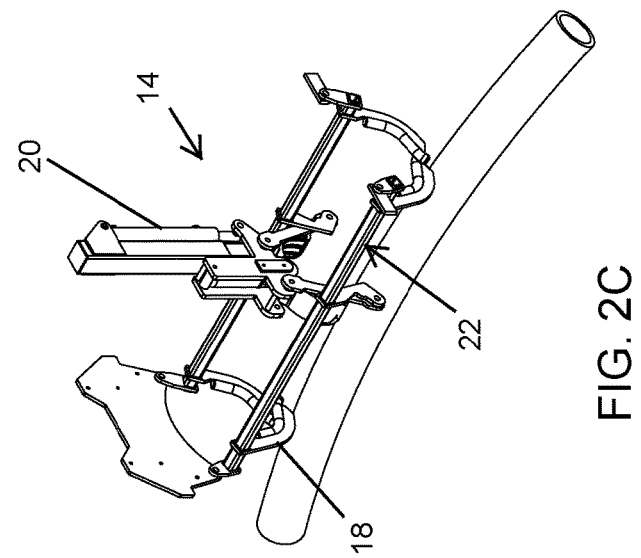
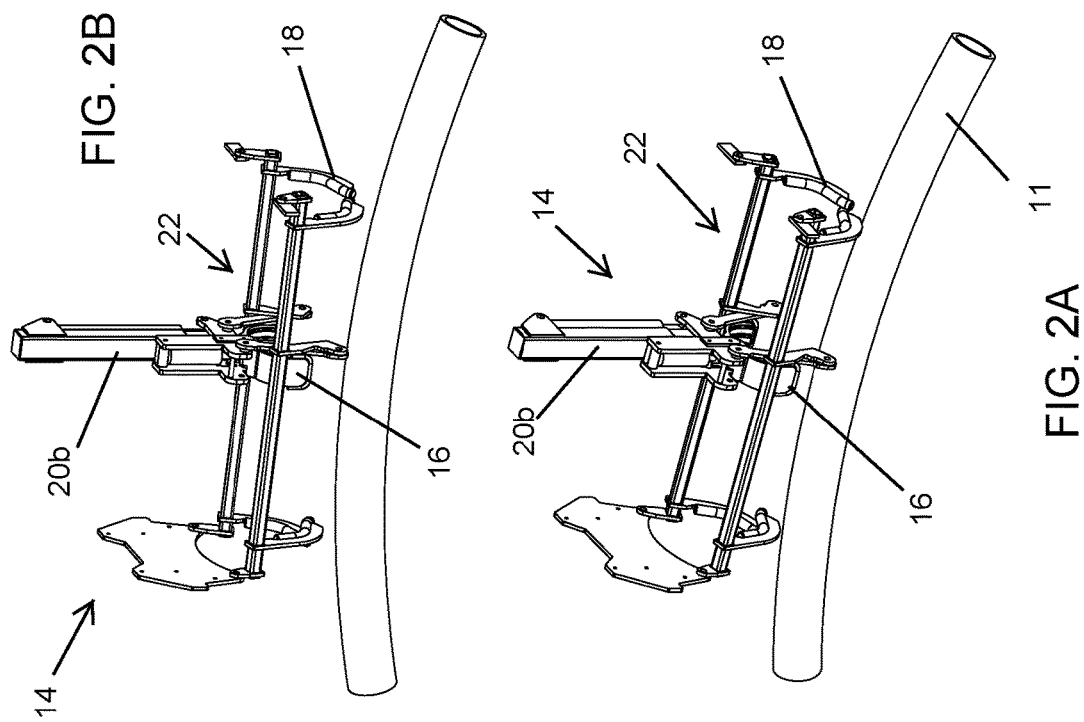

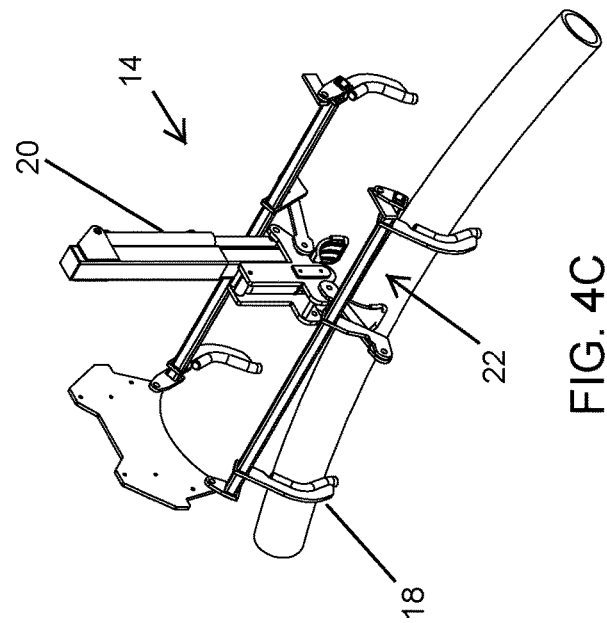
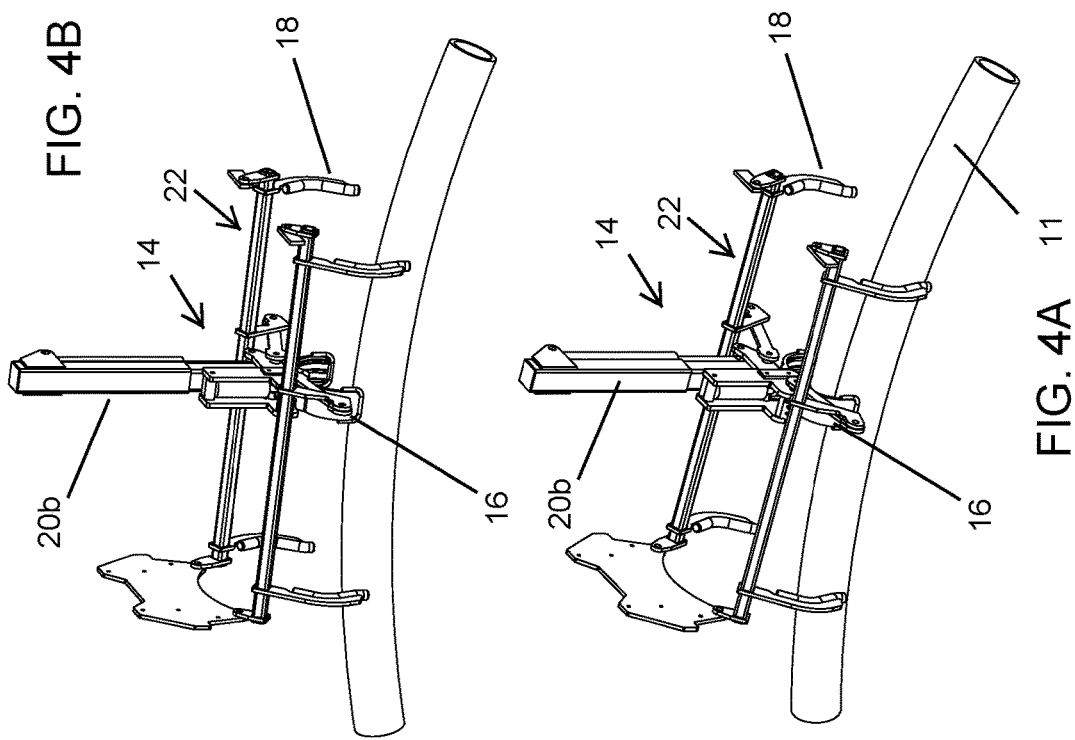

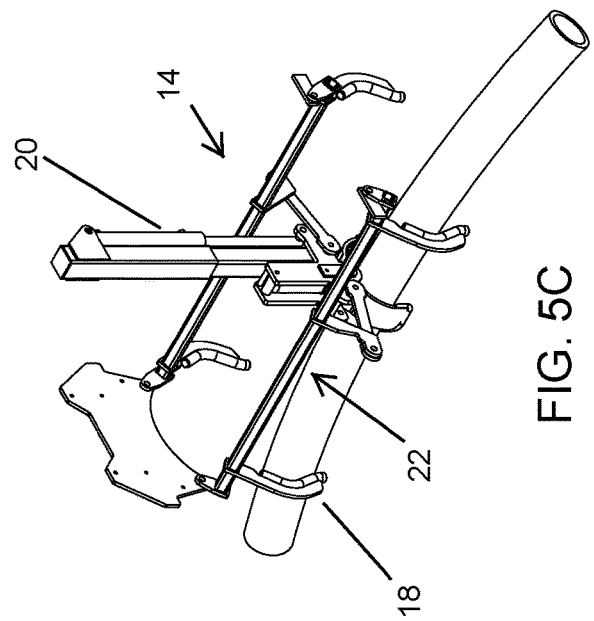
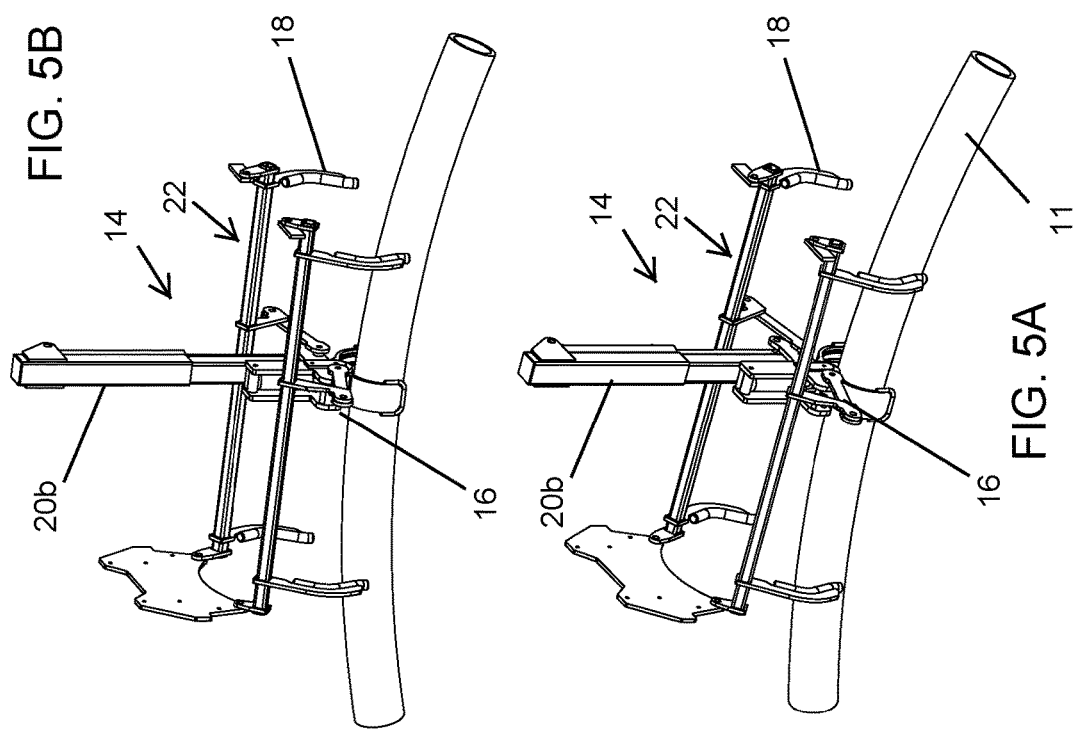

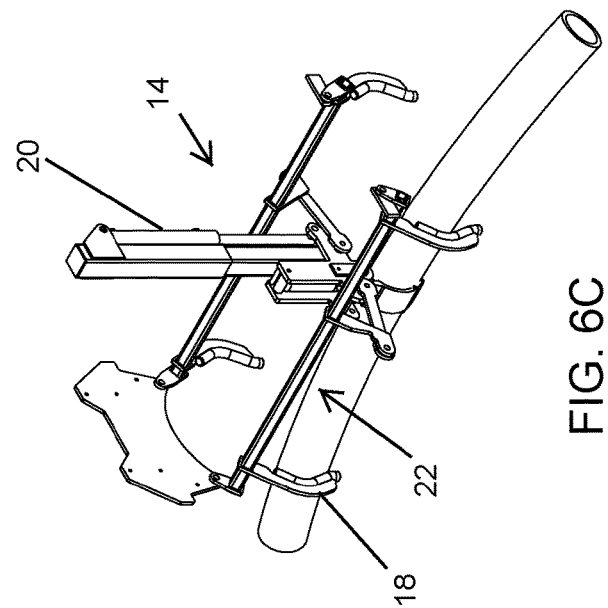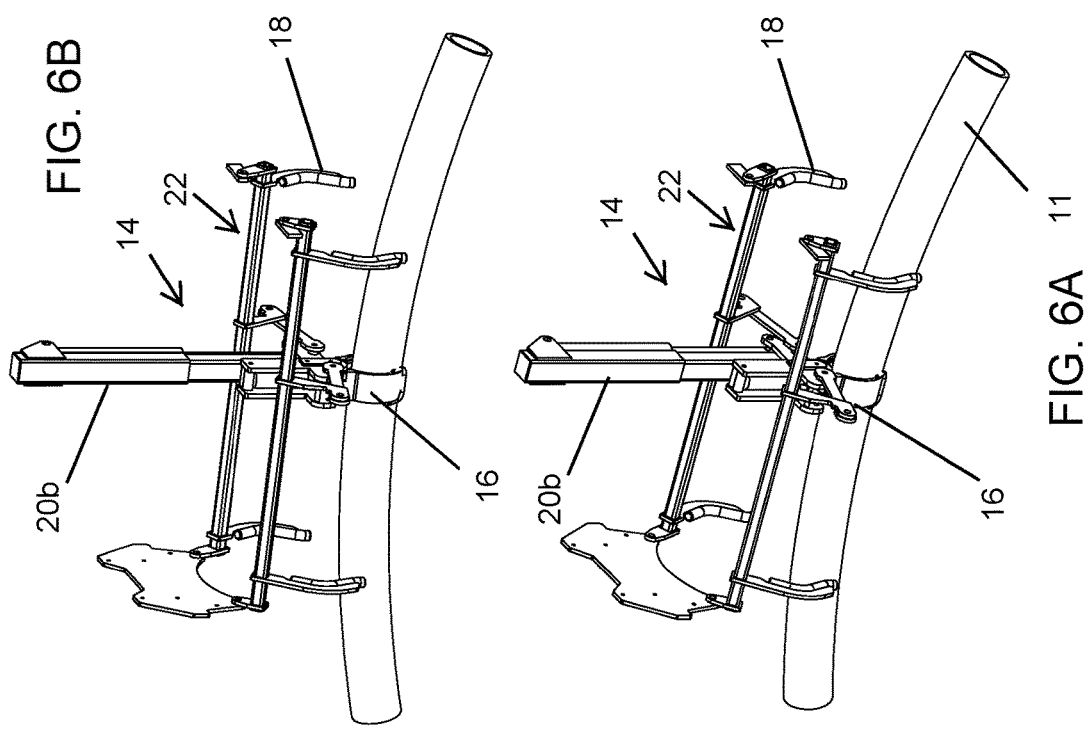

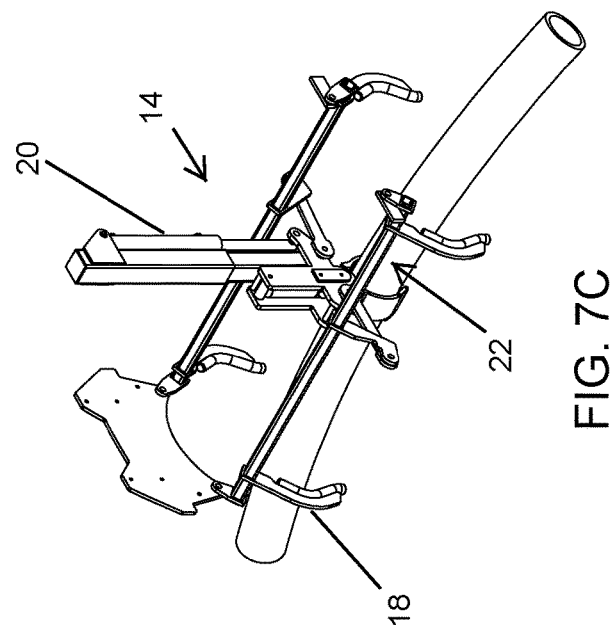
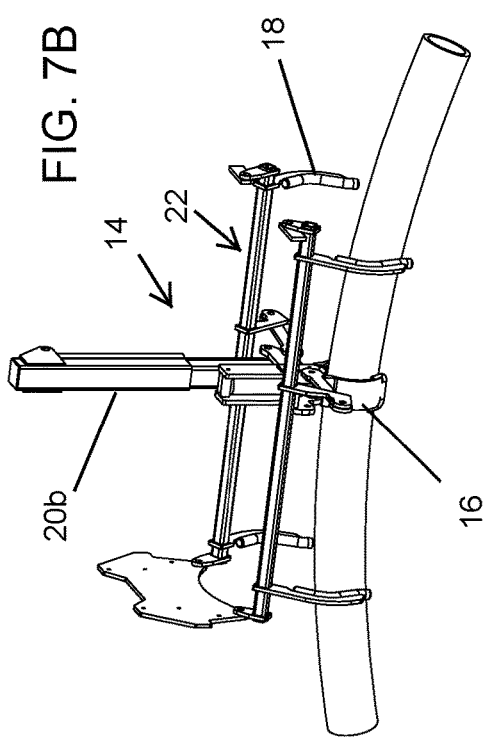
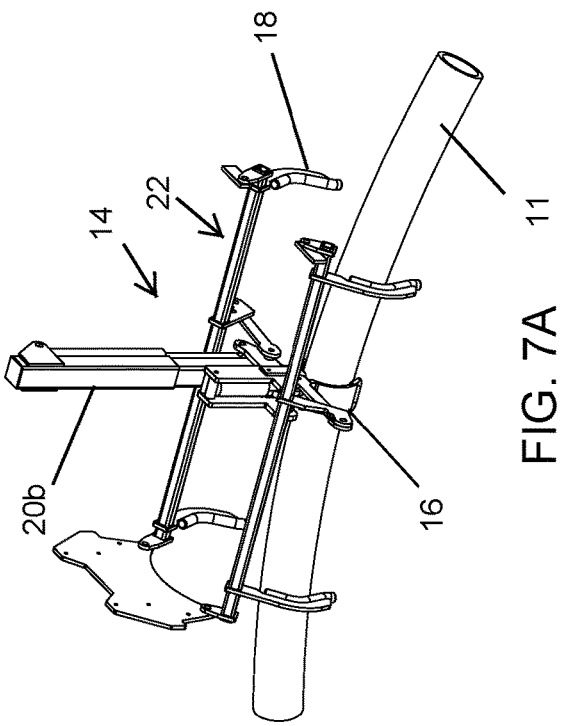

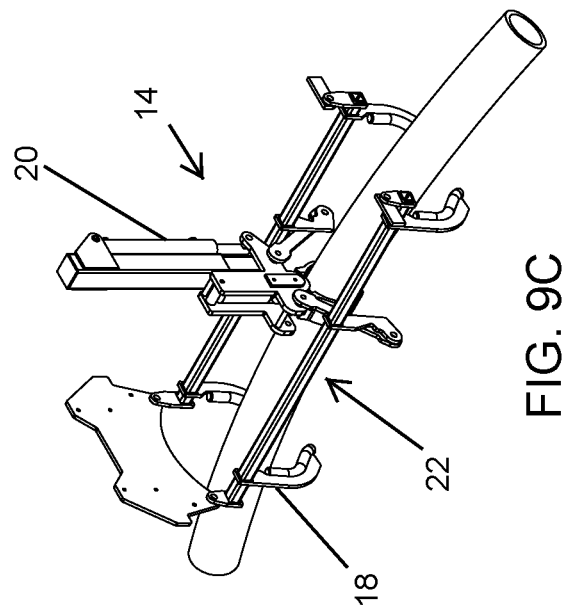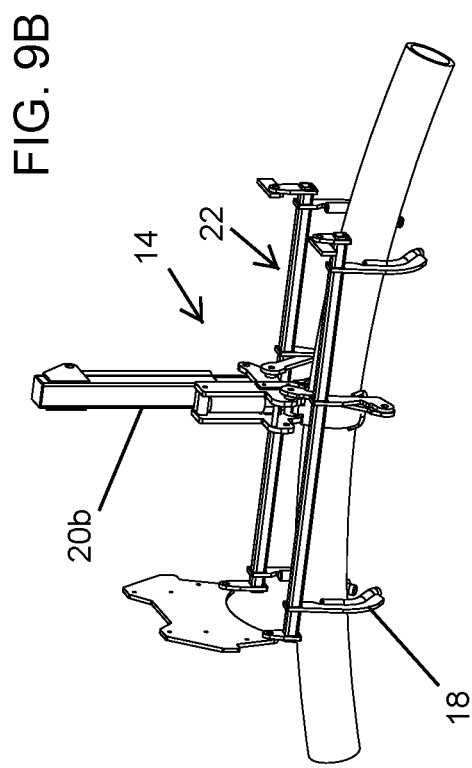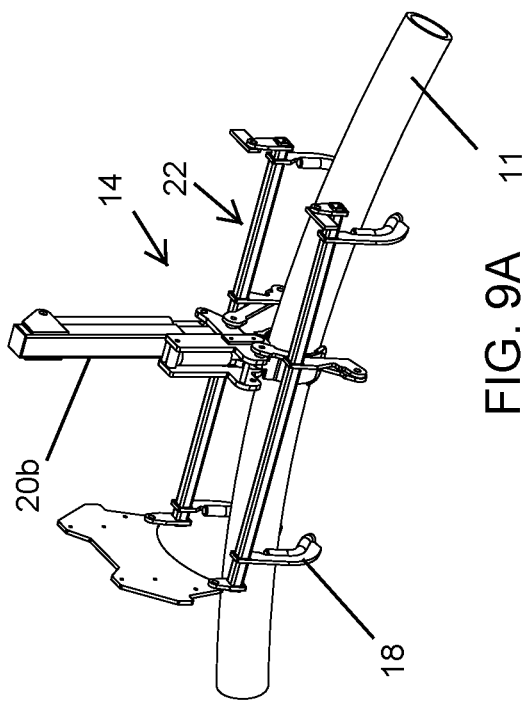

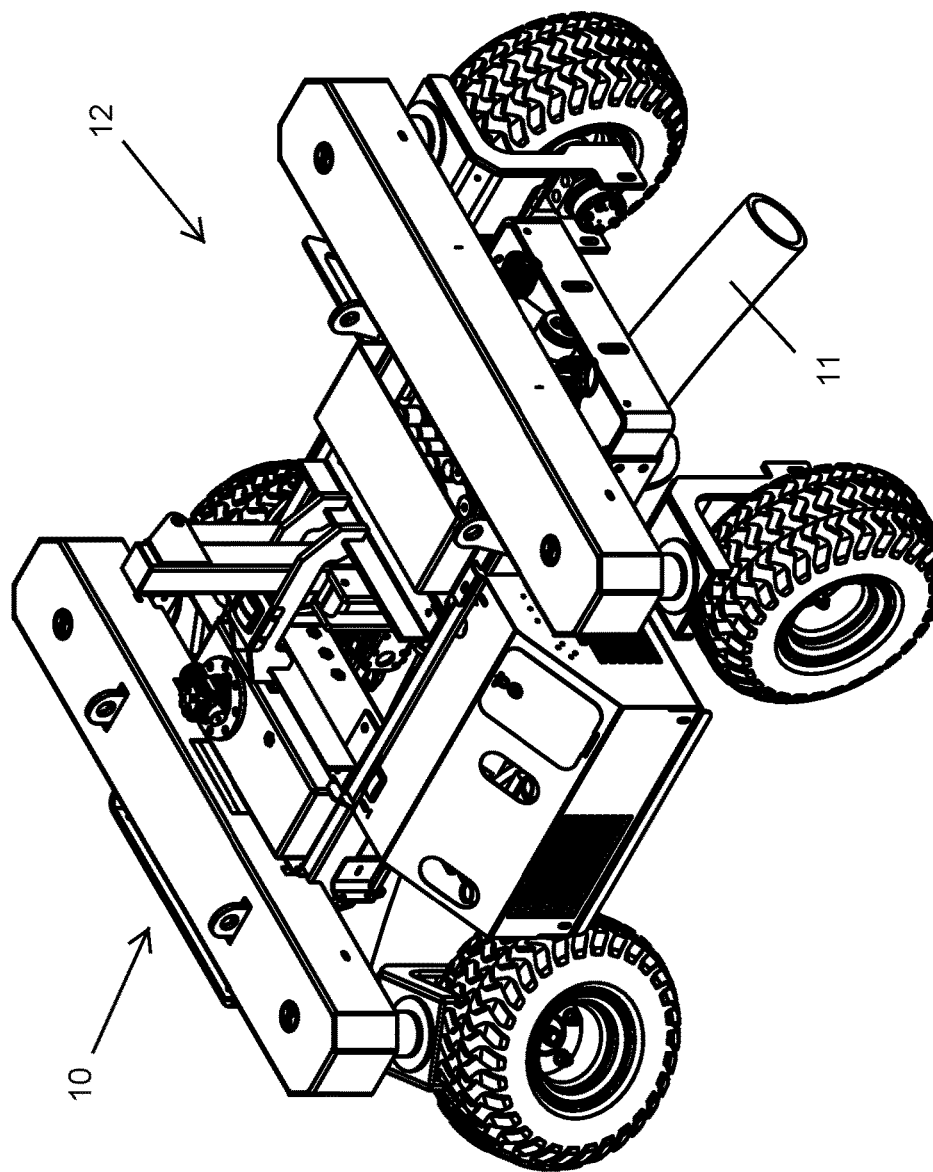
FIG. 11  TWO WHEEL STEERING

CRAB STEERING

TWO WHEEL STEERING

FIG. 15  CRAB STEERING

US 10,443,251 B2

WHEELED CONCRETE SUPPLY HOSE MOVING DEVICE

CROSS REFERENCE TO RELATED APPLICATION

The present application claims the filing benefits of U.S. provisional application Ser. No. 62/410,093, filed Oct. 19, 2016, which is hereby incorporated herein by reference in its entirety.

FIELD OF THE INVENTION

The present invention relates generally to concrete placing devices and, more particularly, to devices for placing concrete via one or more concrete supply hoses that provide a conduit for directing uncured concrete to a targeted location.

BACKGROUND OF THE INVENTION

Typically, uncured concrete may be conveyed or conduited from a source or supply, such as a truck or the like, to a targeted placing location, where the uncured concrete is discharged onto the targeted area via a discharge device or nozzle. The uncured concrete is often pumped into a flexible concrete supply hose that may be laid along the ground or subgrade surface between the concrete supply or source and the discharge device. As the discharge device is moved over the targeted area, the supply hose must also be moved to accommodate the movement of the discharge device relative to the concrete source. Also, as the discharge device is moved toward the concrete source, sections of the hose may be removed to shorten the supply hose or conduit between the concrete source and the discharge device. Such movement and removal of the hose and hose sections is often highly labor intensive, since the hose and/or hose section typically has uncured concrete therein and, thus, is quite heavy for a person or persons to lift and/or move over the ground or subgrade surface.

SUMMARY OF THE INVENTION

The present invention provides a concrete supply hose moving device that includes a wheeled frame or unit and a hose grasping device for grasping and lifting a concrete supply hose or section of hose, whereby one or more additional hose supports grasp and support the lifted hose, so that the wheeled unit may readily move the concrete supply hose or section of hose to a desired location. The hose supports are operable to open and close responsive to vertical movement of the hose grasping device, such that a single actuator raises and lowers the hose grasping device and causes opening and closing of the hose support devices. Such cooperative operation of the hose support devices is provided via a mechanical linkage between the hose support devices and a vertically movable frame or bracket at which the hose grasping device is mounted.

These and other objects, advantages, purposes and features of the present invention will become apparent upon review of the following specification in conjunction with the drawings.

BRIEF DESCRIPTION OF THE DRAWINGS

FIGS. 2A-C are perspective views of a hose lifting and supporting device of the wheeled hose moving device of FIG. 1, shown above a section of hose;

FIGS. 4A-C are perspective views of the hose lifting and supporting device, shown as the center grasping element moves further downward towards the hose section;

FIGS. 5A-C are perspective views of the hose lifting and supporting device, shown as the center grasping element engages the hose section;

FIGS. 6A-C are perspective views of the hose lifting and supporting device, shown as the center grasping element grasps the hose section;

FIGS. 7A-C are perspective views of the hose lifting and supporting device, shown as the center grasping element begins to lift the hose section;

FIGS. 9A-C are perspective views of the hose lifting and supporting device, shown as the center grasping element lifts the hose section further whereby the support elements continue to close;

FIG. 11 is another perspective view of the wheeled hose moving device of FIG. 1, shown in a two wheel steering mode, with the front wheels (or rear wheels) used for steering and the other wheels held in a straight or non-steering mode;

DESCRIPTION OF THE PREFERRED EMBODIMENTS

Figure 1:
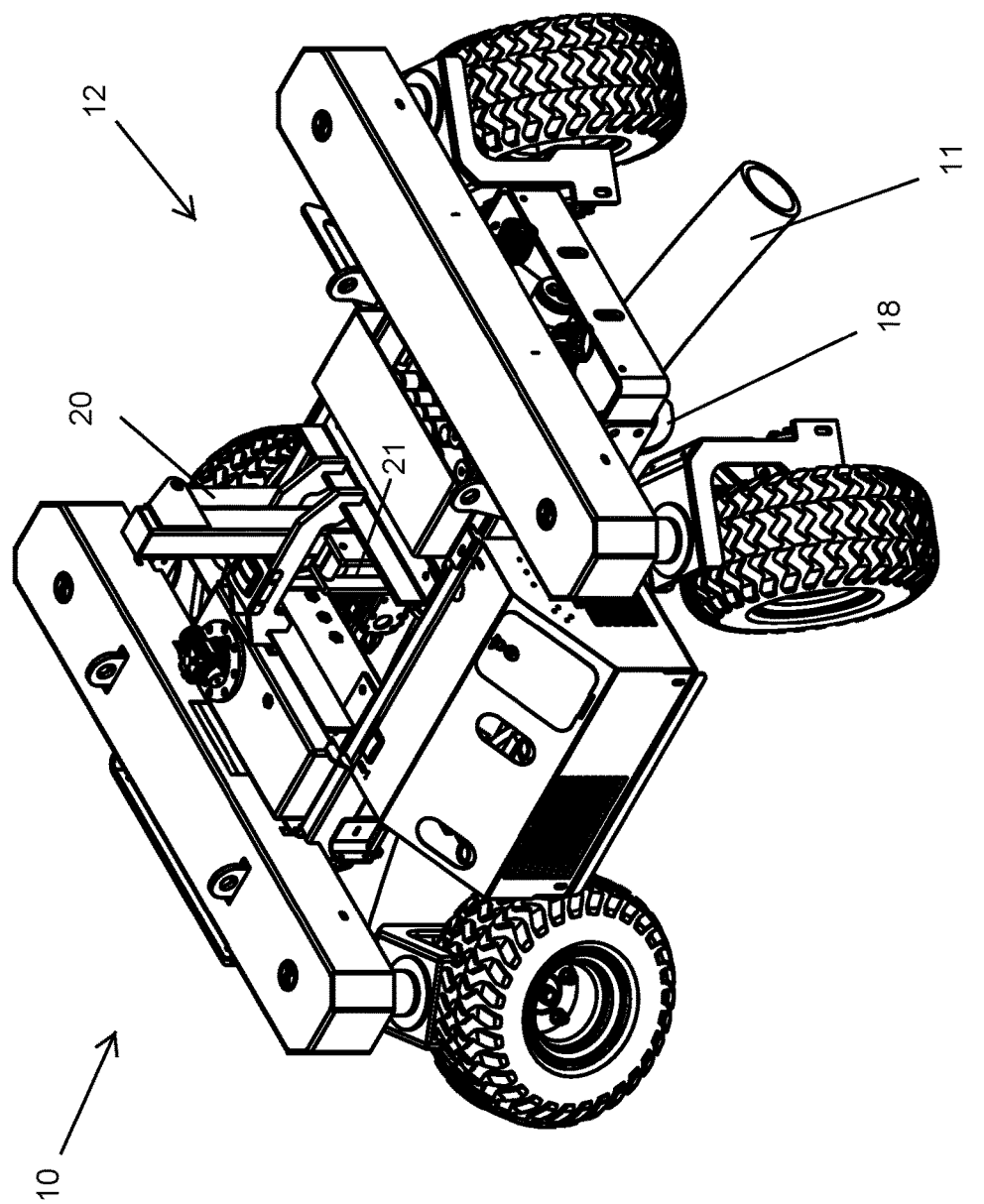
FIG. 1 is a perspective view of a wheeled hose moving device in accordance with the present invention, shown supporting a section of hose, and shown in a four wheel steering mode, with the front and rear wheels used for steering.
Figure 2D:
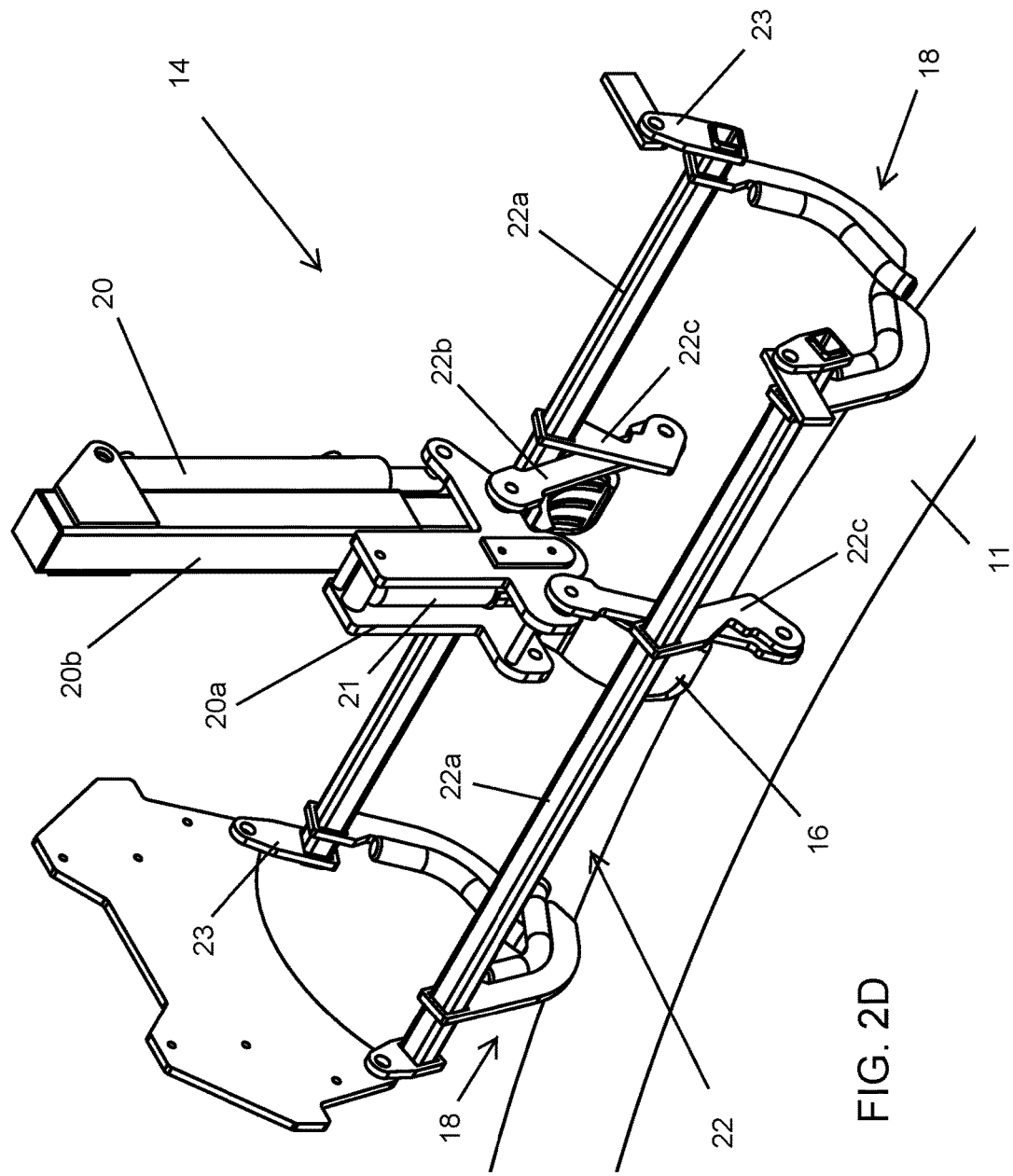
FIG. 2D is an enlarged perspective view of the device of FIG. 2C.
Figure 3C:
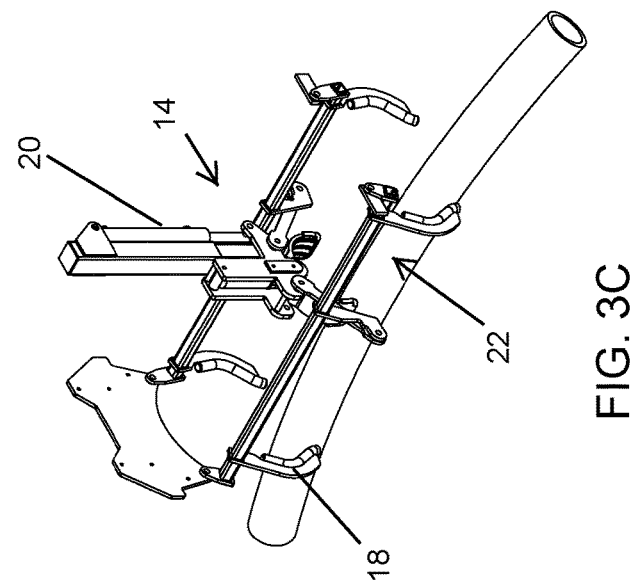
FIGS. 3A-C are perspective views of the hose lifting and supporting device, shown as the center grasping element begins to move downward and the two hose support elements open.
Figure 3B:
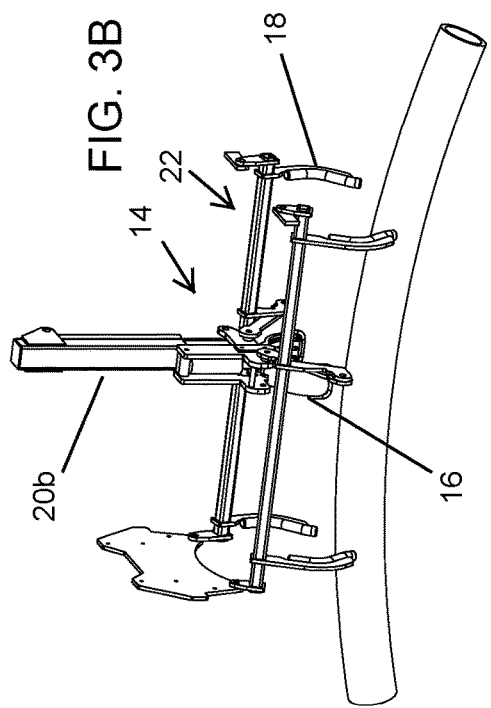
Figure 3A:
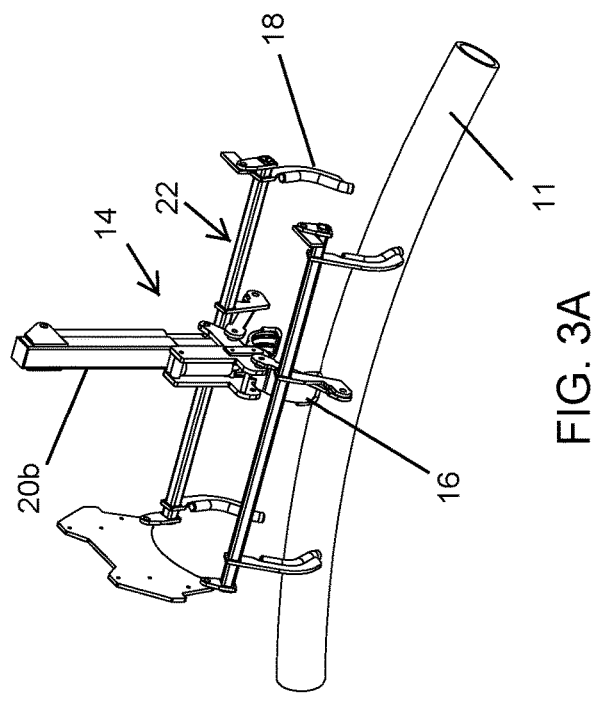
Figure 3D:
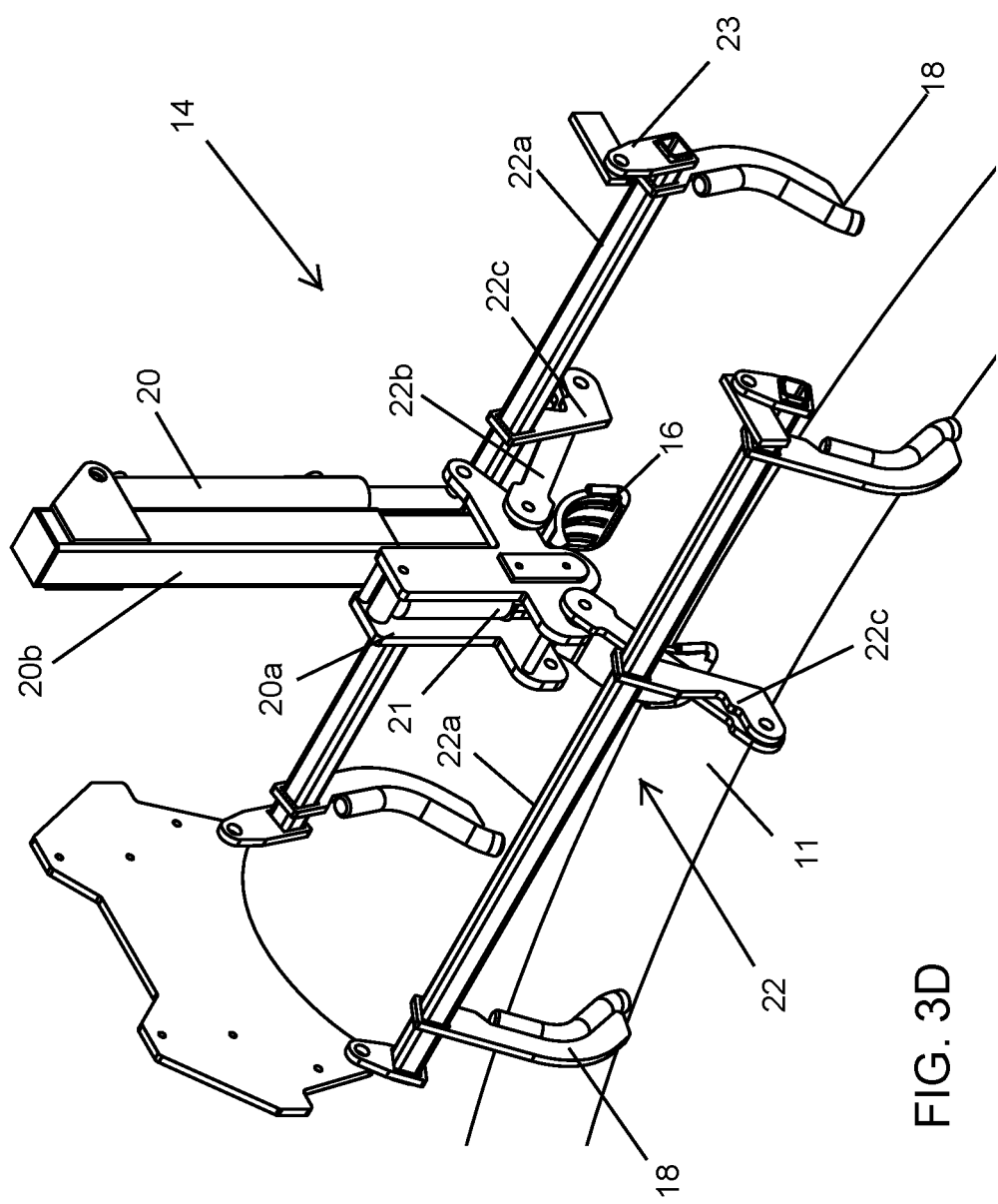
FIG. 3D is an enlarged perspective view of the device of FIG. 3C.
Figure 4D:
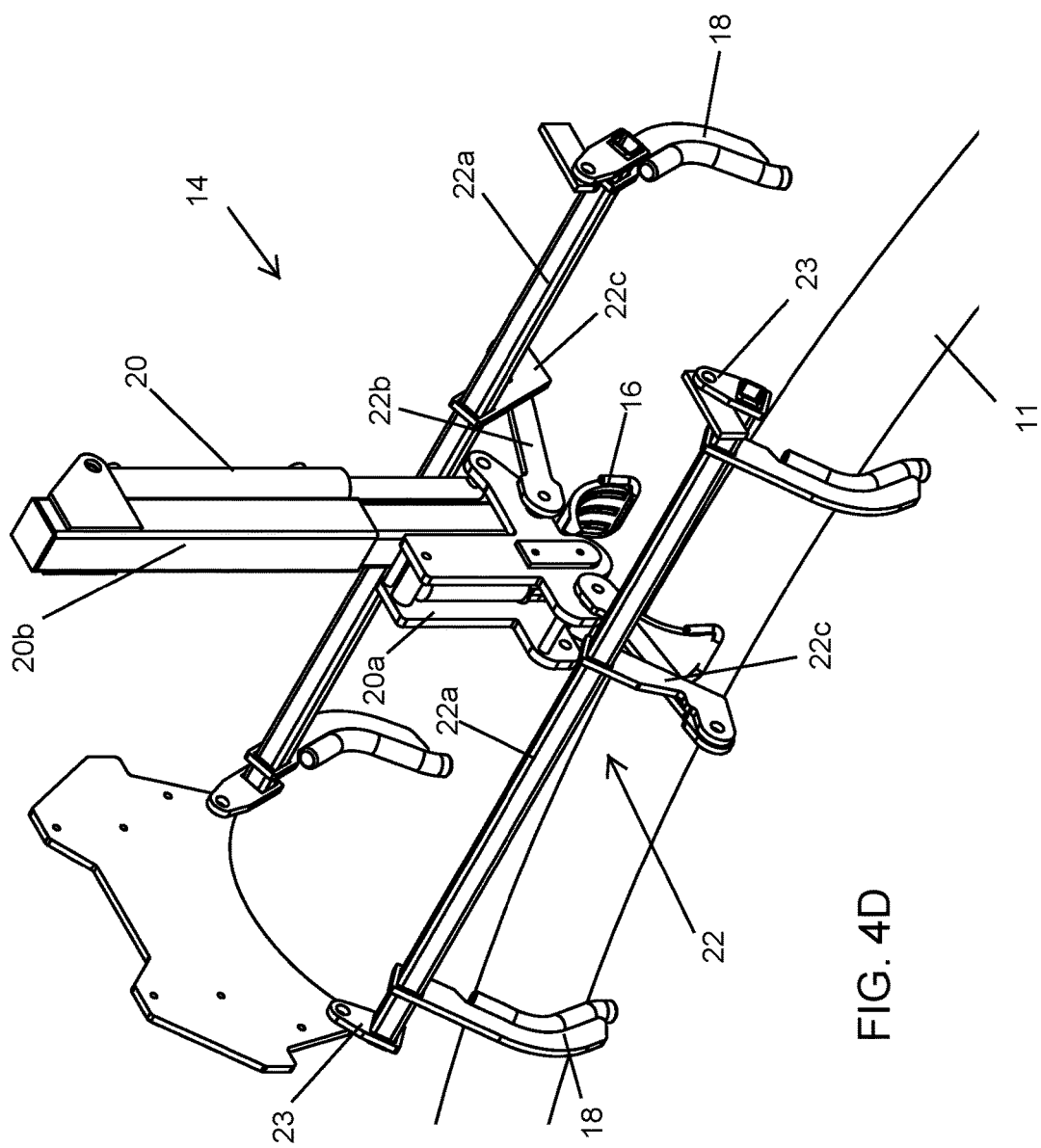
FIG. 4D is an enlarged perspective view of the device of FIG. 4C.
Figure 6D:
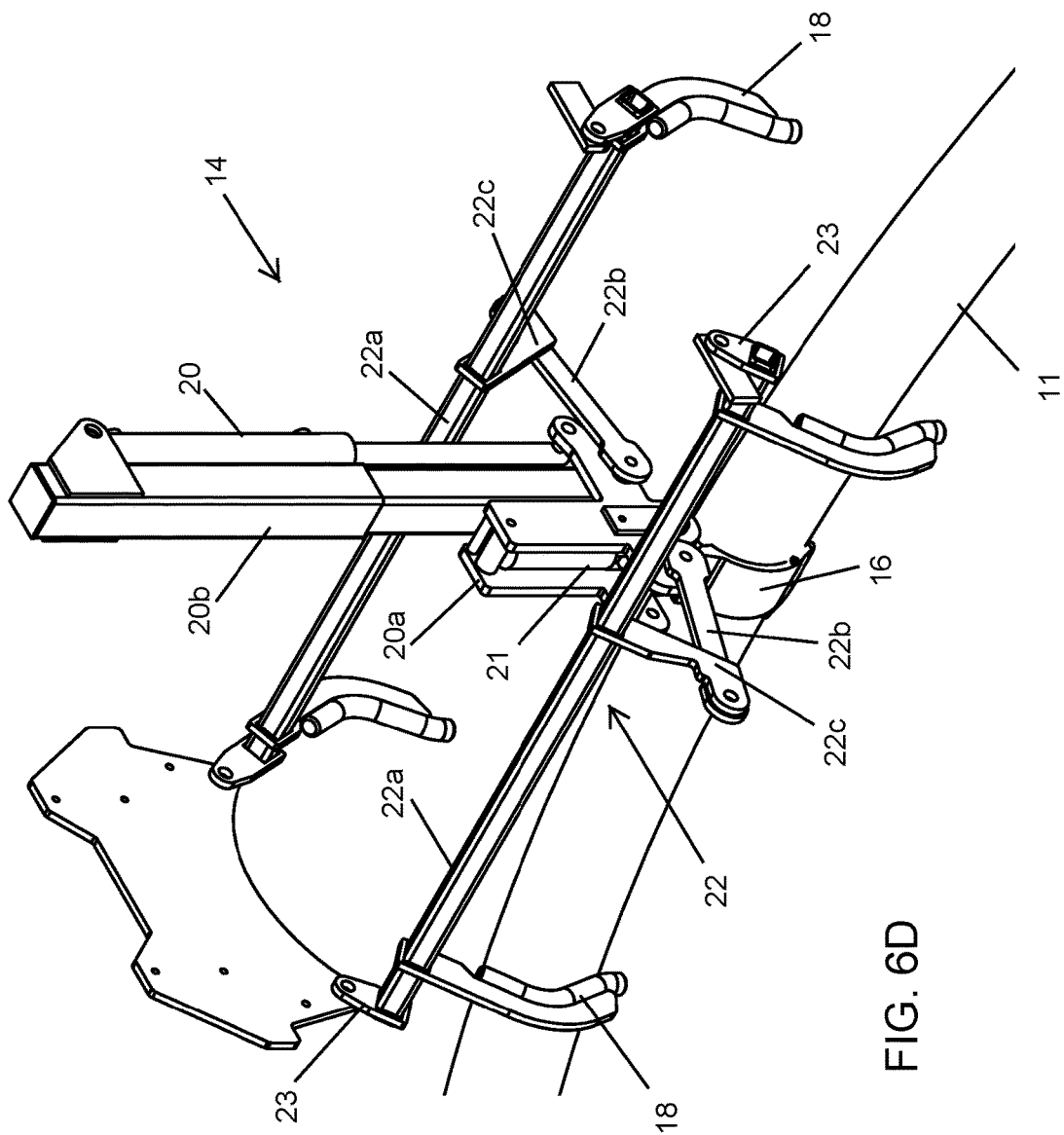
FIG. 6D is an enlarged perspective view of the device of FIG. 6C.
Figure 8C:
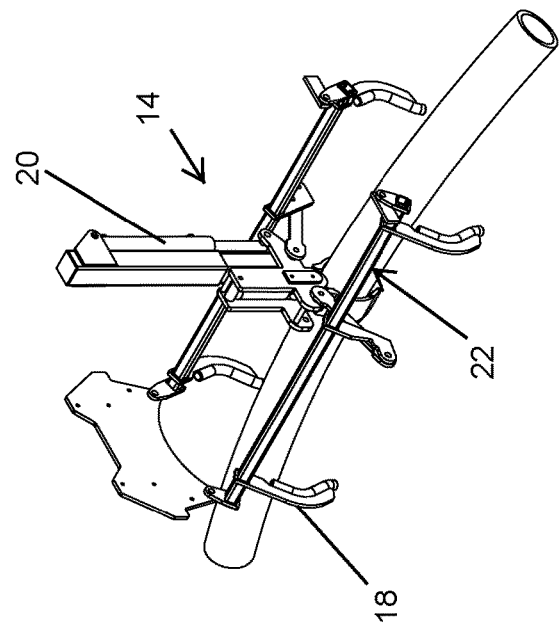
FIGS. 8A-C are perspective views of the hose lifting and supporting device, shown as the center grasping element lifts the hose section towards the support elements whereby the support elements begin to close.
Figure 8B:
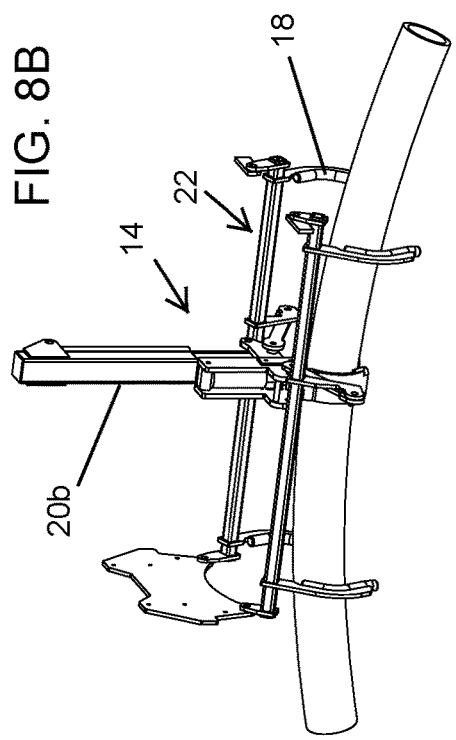
Figure 8A:
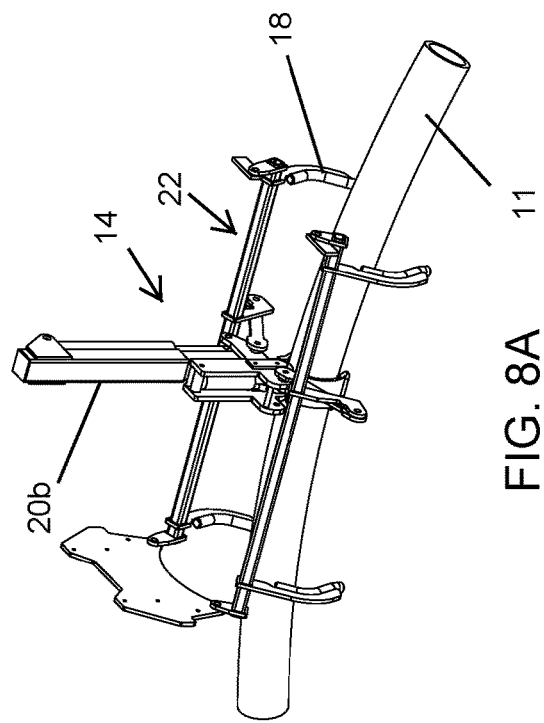
Figure 8D:
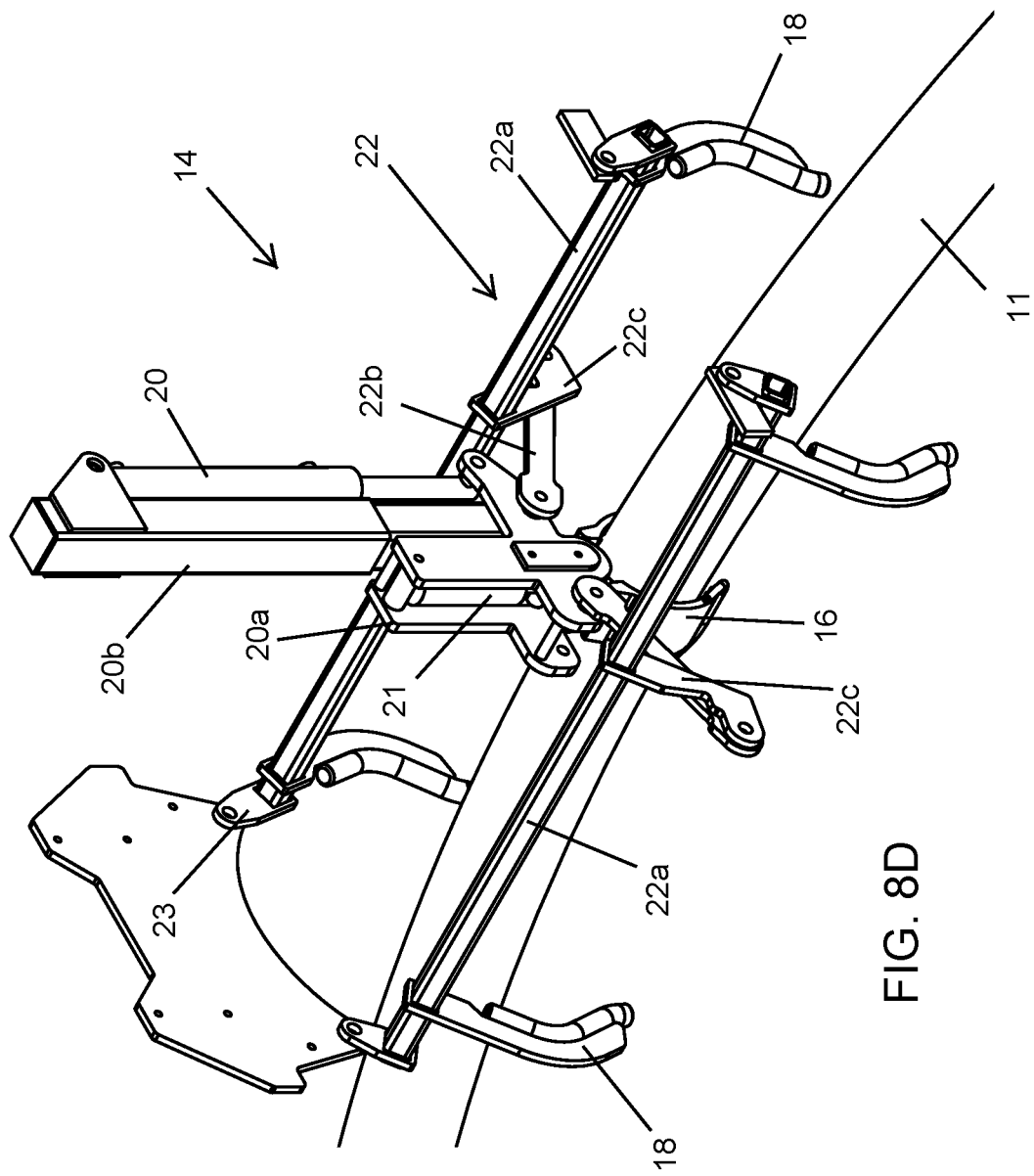
FIG. 8D is an enlarged perspective view of the device of FIG. 8C.
Figure 9D:
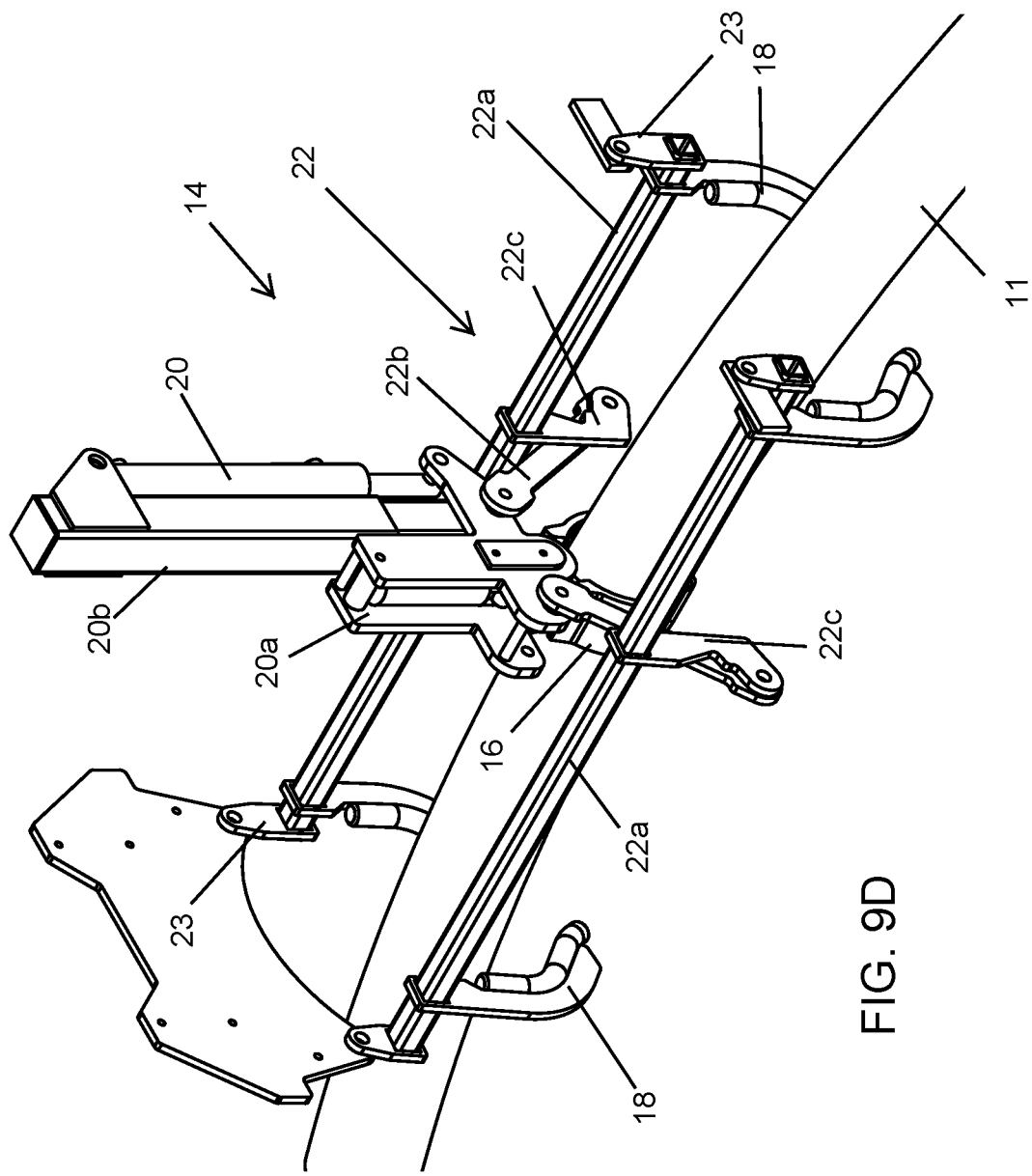
FIG. 9D is an enlarged perspective view of the device of FIG. 9C.
Figure 10C:
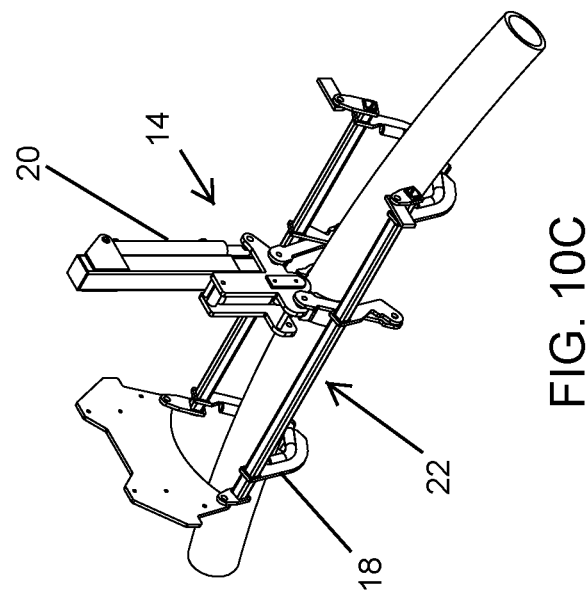
FIGS. 10A-C are perspective views of the hose lifting and supporting device, shown as the center grasping element lifts the hose section to a lifted or support position whereby the support elements close around or below the lifted hose section.
Figure 10B:
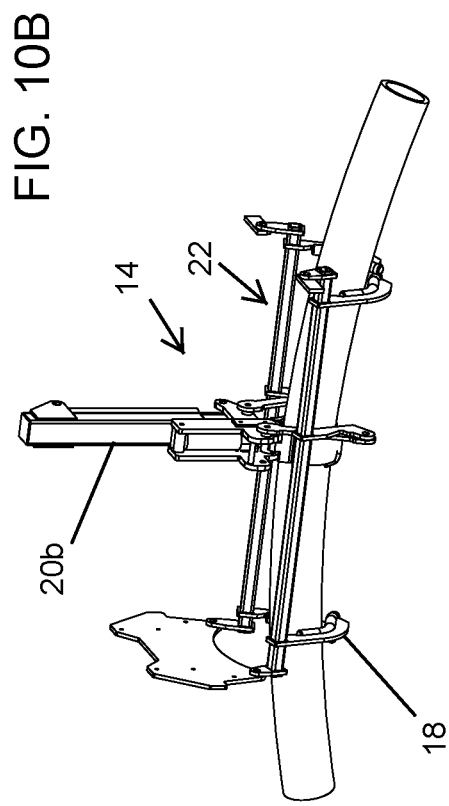
Figure 10A:
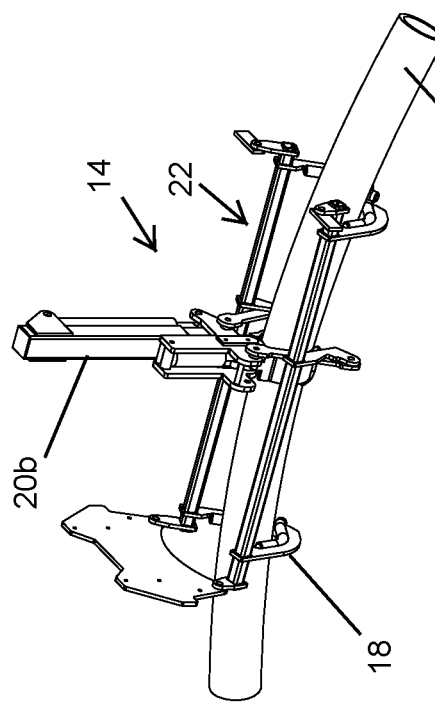

Referring now specifically to the drawings and the illustrative embodiments depicted therein, a wheeled hose moving device or apparatus or machine 10 is operable to grasp and move a concrete supply hose or section of hose 11. The wheeled hose moving device 10 includes a wheeled support or base unit 12 and at least one hose grasping and lifting device or mechanism or apparatus 14 that is movably supported by wheeled support unit 12. As shown in FIGS. 2A-10C, the hose grasping and lifting device 14 includes a central grasping and lifting device or element 16 and two support devices or elements 18, one at or near each end of the wheeled support unit 12. The central grasping and lifting element 16 (comprising a pair of curved arms configured to receive or grasp a concrete supply hose when in a closed or grasping orientation) is generally vertically movable (such as via an elevation device 20) and is adjustable to engage and grasp a concrete supply hose and to lift or raise or generally vertically move the concrete supply hose, as discussed below. As the central grasping and lifting element is raised and lowered, the support elements 18 are opened and closed responsive to the raising/lowering of the grasping device, such as via a linkage assembly 22, as also discussed below. Thus, the hose grasping and lifting element 14 is operable to lift and support a hose section via a single actuator or hydraulic cylinder or the like. The wheeled support unit 12 may be driven and steered to move the lifted concrete supply hose to a desired or appropriate or targeted location, as also discussed below.

The wheeled support unit 12 includes a frame portion supported by a pair of rubber-tired wheels. The wheels may be rotatably driven via respective drive motors, such as hydraulic motors or the like, to provide driving of the apparatus over and through the uncured concrete or sub-grade materials. The drive motors (see hydraulic circuit of FIG. 16) may be actuated and deactuated and controlled via a user input or control of the wheeled support unit 12 (which may be at or on the unit or remote from the unit whereby the unit is steered via remote control).

Figure 16:
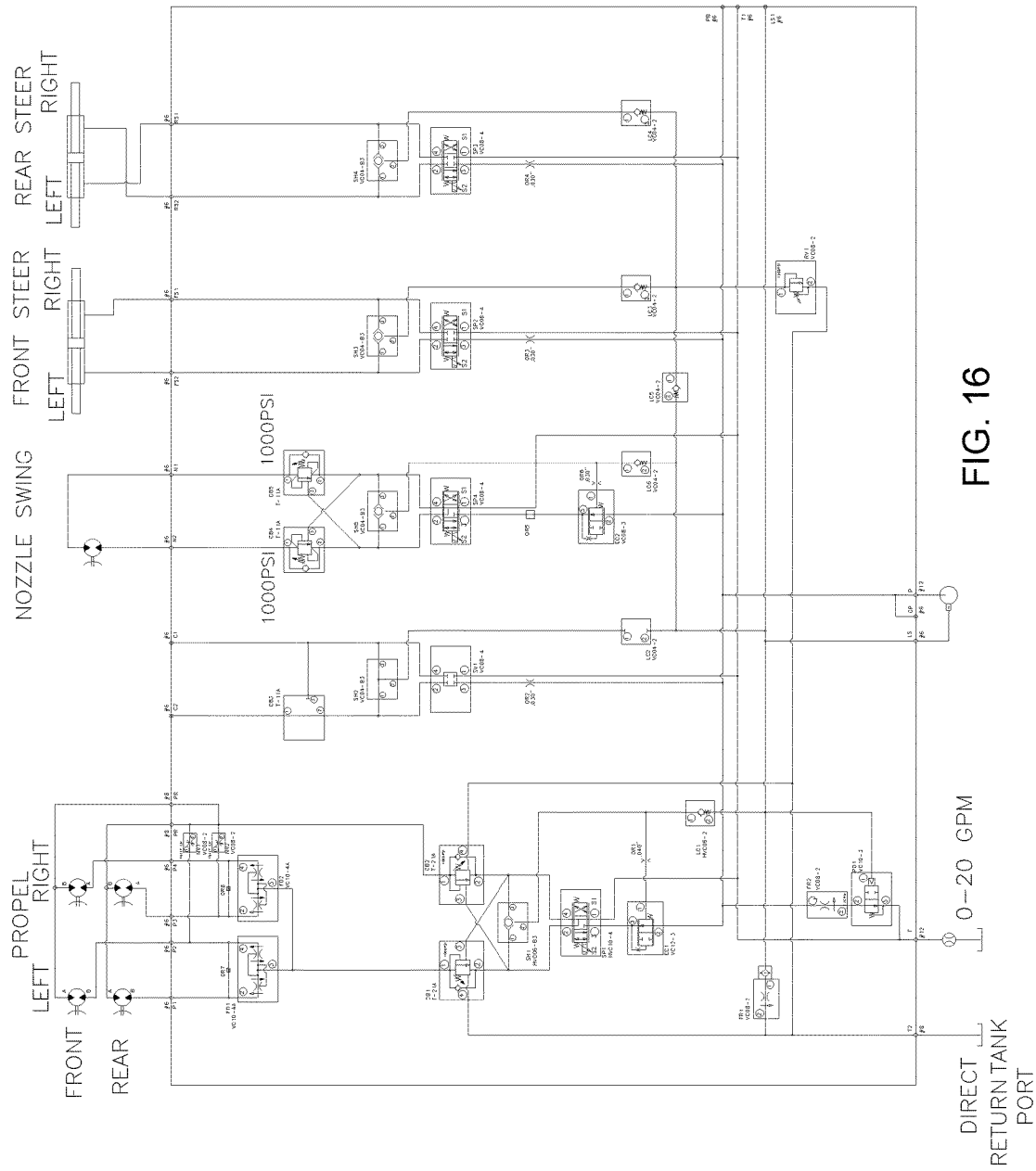
FIG. 16 is a schematic of a hydraulic system for steering the wheeled hose moving device of the present invention.

Wheeled support unit 12 includes a power source, such as a gasoline powered engine or the like, and a hydraulic control system for controlling operation of hydraulic motors and hydraulic actuators and/or the like (FIG. 16). The wheels and drive motors are mounted to the respective generally vertical posts, such as by utilizing aspects of the wheeled devices described in U.S. Publication No. US-2007-0090203 and/or U.S. Pat. Nos. 6,588,976 and/or 6,623,208, which are hereby incorporated herein by reference in their entireties. The drive motors and wheels may be independently driven and/or correspondingly driven and/or differentially driven, such as to assist in controlling and/or steering the wheeled support unit 12 as it is driven and moved over the surface. For example, the drive motors may comprise hydraulic motors that are powered via a hydraulic pump and solenoids or control valves (FIG. 16), and which may be differentially powered so as to adjust the power or pressure at each drive motor so as to limit slippage of one or both of the wheels as the wheeled support unit is driven along the support surface and/or over the concrete supply hose at the support surface.

Figure 12:
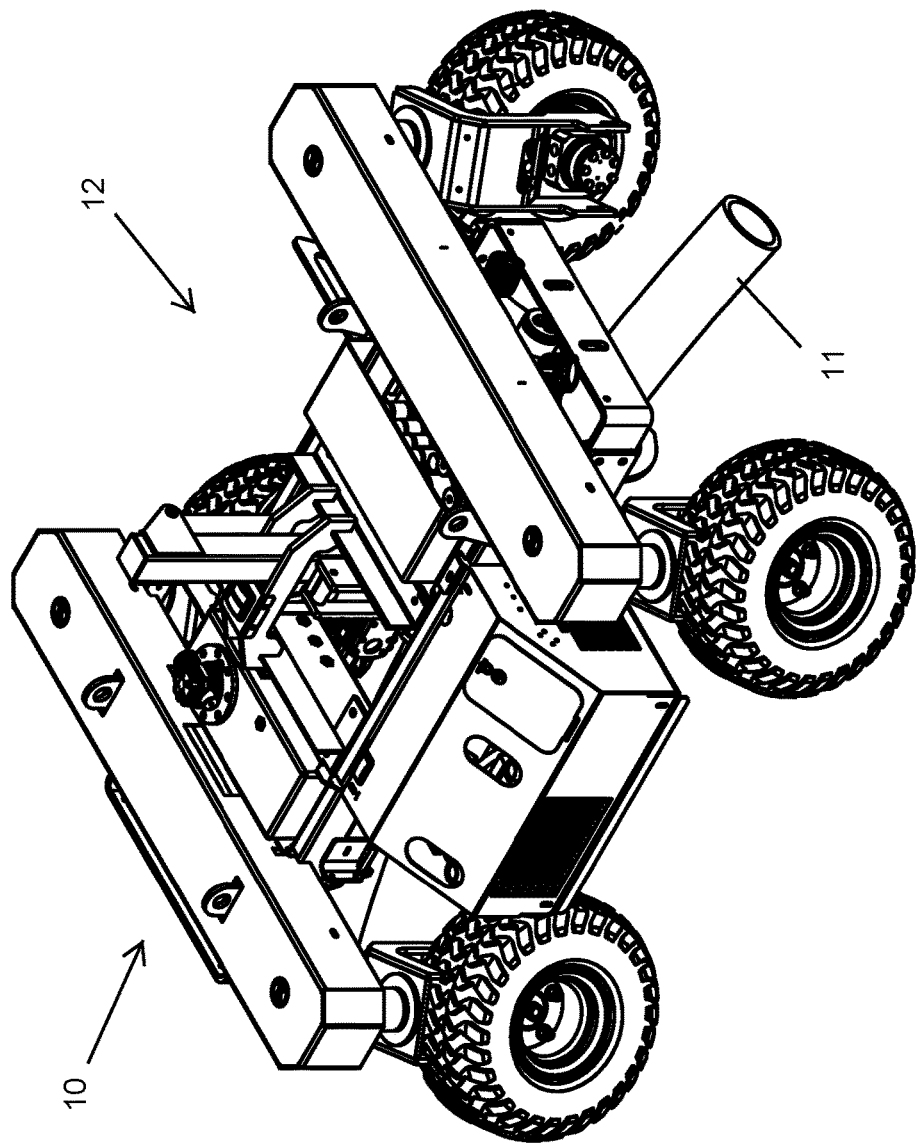
FIG. 12 is a perspective view of the wheeled hose moving device of FIG. 1, shown in a crab steering mode, with the front and rear wheels used for steering.

The wheeled support unit may be steered by an operator as the wheeled support unit is driven or powered along and over the ground or support surface. The wheels may be steered or turned via correspondingly pivoting the wheels and motors about their respective generally vertical pivot axes defined by the posts to turn the wheels relative to the frame portion of the wheeled unit. As shown in FIG. 1, all four wheels may be controlled in a "four wheel steering" mode, where the wheels may be individually turned or pivoted about their vertical pivot axes or where the front wheels are pivoted in tandem and the rear wheels are pivoted in tandem to steer the wheeled unit as it moves the concrete hose. Optionally, and such as shown in FIG. 11, the rear wheels may be locked or held in a straight configuration and the front wheels may be pivoted or steered to provide a "two wheel steering" mode for steering and maneuvering the wheeled unit. Optionally, and such as shown in FIG. 12, the front and rear wheels may be controlled and pivoted and steered to provide a "crab steering" mode for steering and maneuvering the wheeled unit. The steering mode may be selected by an operator that is remotely controlling the wheeled device and may switch between the different steering modes to maneuver the wheeled device in the desired or appropriate manner at the support surface. Optionally, the path of travel (and the appropriate steering modes) may be programmed so that the wheeled device maneuvers along a pre-programmed path during placing of the concrete at the support surface.

The wheeled support unit 12 may include the mechanical frame and components, a supply of hydraulic fluid or oil in a reservoir, a hydraulic pump, control valves, hydraulic pressure lines, and an electrical system including a battery and charging system. The hose moving device of the present invention may utilize aspects of various wheeled devices, such as screeding devices of the types described in U.S. Pat. Nos. 7,195,423; 7,175,363; 7,121,762; 6,976,805 and/or 6,953,304, which are hereby incorporated herein by reference in their entireties.

The grasping and lifting and supporting device 14 is mounted to or attached to the wheeled support unit 12 and is operable to lower the grasping device 16 toward and into engagement with the concrete supply hose via elevation device 20 and to cause the grasping device 16 to grasp the concrete supply hose. In the illustrated embodiment, the grasping device 16 comprises a pair of curved grasping arms that are pivotally attached at a vertically movable bracket or frame 20a and that, when closed, engage and grasp a hose section to grasp and retain and lift the hose section. When the grasping device 16 has engaged and grasped or clamped onto the concrete supply hose, the elevation device 20 may raise or elevate or lift the grasping device 16 and the concrete supply hose grasped therein so that at least a portion of the concrete supply hose or section of hose is lifted above the ground. As the grasping device is raised, the linkage assembly 22 (which is linked to the vertically moving frame 20a that moves with the grasping element 16) imparts a pivotal movement of the support elements 18 (which may comprise curved support arms) to open and close the support elements.

In the illustrated embodiment, the arms of the grasping and lifting device 16 are pivotally mounted at the frame portion 20a, which is vertically movable along a vertical support 20b via actuation of actuator 20 (such as a linear actuator or hydraulic cylinder or the like). The actuator 20 provides for generally vertical movement of the bracket or frame 20a and rotation of the bracket or frame about a generally vertical or longitudinal axis of the actuator is generally precluded (this may be accomplished via any know means, such as non-cylindrical construction of the telescoping vertical support 20b). The extension and retraction of the actuator 20 causes a generally vertical movement of the bracket 20a, upon which the grasping device 16 is mounted, so as to vertically move or raise and lower the grasping device 16 between a raised position or orientation and a lowered position or orientation. The actuator 20 may be selectively controlled to selectively raise and lower the grasping device 16, such as in response to a user input or the like. For example, an operator may toggle or actuate a toggle switch or the like at a remote control panel to selectively extend and retract the actuator to lower and raise the grasping device when desired.

When the grasping device (in its opened position or state) is lowered to engage a hose (see FIGS. 5A-C), the grasping device is closed at least partially around the hose to grasp the hose for lifting (see FIGS. 6A-D). The opening and closing of the grasping device may be achieved via an actuator 21 mounted at the bracket or frame 20a and separately controlled to open and close the grasping device at the appropriate time. Optionally, the opening and closing of the grasping device may be achieved mechanically, such as by a linkage that causes closing of the grasping device when the grasping device is lowered a predetermined amount or when a part of the grasping device engages a hose section. After the grasping device is closed around or partially around a hose section, the actuator 20 may be actuated to raise the frame 20a, which imparts movement of linkages of the linkage assembly 22 to pivot the support elements 18 as the hose is raised upward to the level of the support elements.

In the illustrated embodiment, each of the support elements 18 comprises a pair of curved arms that are pivotable relative to one another via operation of the linkage assembly 22. The linkage assembly 22 comprises a pair of elongated linkages or members 22a that are pivotally mounted at a frame of the wheeled unit (such as via end brackets 23 that pivotally mount at the frame with a pivot axis spaced from a longitudinal axis of the respective elongated linkages 22a). The linkages 22a are non-circular shaped and the arms of the support elements 18 are attached at or near opposite ends of the linkages 22a, such that rotation or swinging movement of the linkages 22a cause pivotal movement of the arms of the support elements 18. The linkages 22a are linked to the vertically movable frame 20a via a respective pair of linkages 22b, 22c.

In the illustrated embodiment, linkage 22b is pivotally mounted at one end to the bracket or frame 20a, with linkage 22c pivotally mounted at the opposite end of linkage 22b, and with the opposite end of linkage 22c fixedly attached at linkage 22a. Thus, and as can be seen upon review of FIGS. 2A-5C, as the frame or bracket 20a moves vertically downward (via actuation and extension of actuator 20), the linkages 22b, 22c cooperate to pivot and swing the linkages 22a outwardly to open the support elements 18. Likewise, and as can be seen upon review of FIGS. 6A-10C, as the frame 20a moves vertically upward (with the grasping device 16 grasping a hose section), the linkages 22b, 22c cooperate to pivot and swing the linkages 22a from their opened state (FIGS. 6A-D) inwardly toward their closed state (FIGS. 10A-C) to close the support elements 18, such that the hose section is supported at a raised position (via the grasping device 16 and the closed support elements 18). When closed below or partially around the hose section, the support elements 18 support the hose section at or near opposite ends of the wheeled support unit and limit sideward movement or bending of the hose at the support unit. The arms of the support may comprise non-flexible metal elements, and may optionally have a rounded surface and/or cushioning element or the like that engages the hose.

Figure 13:
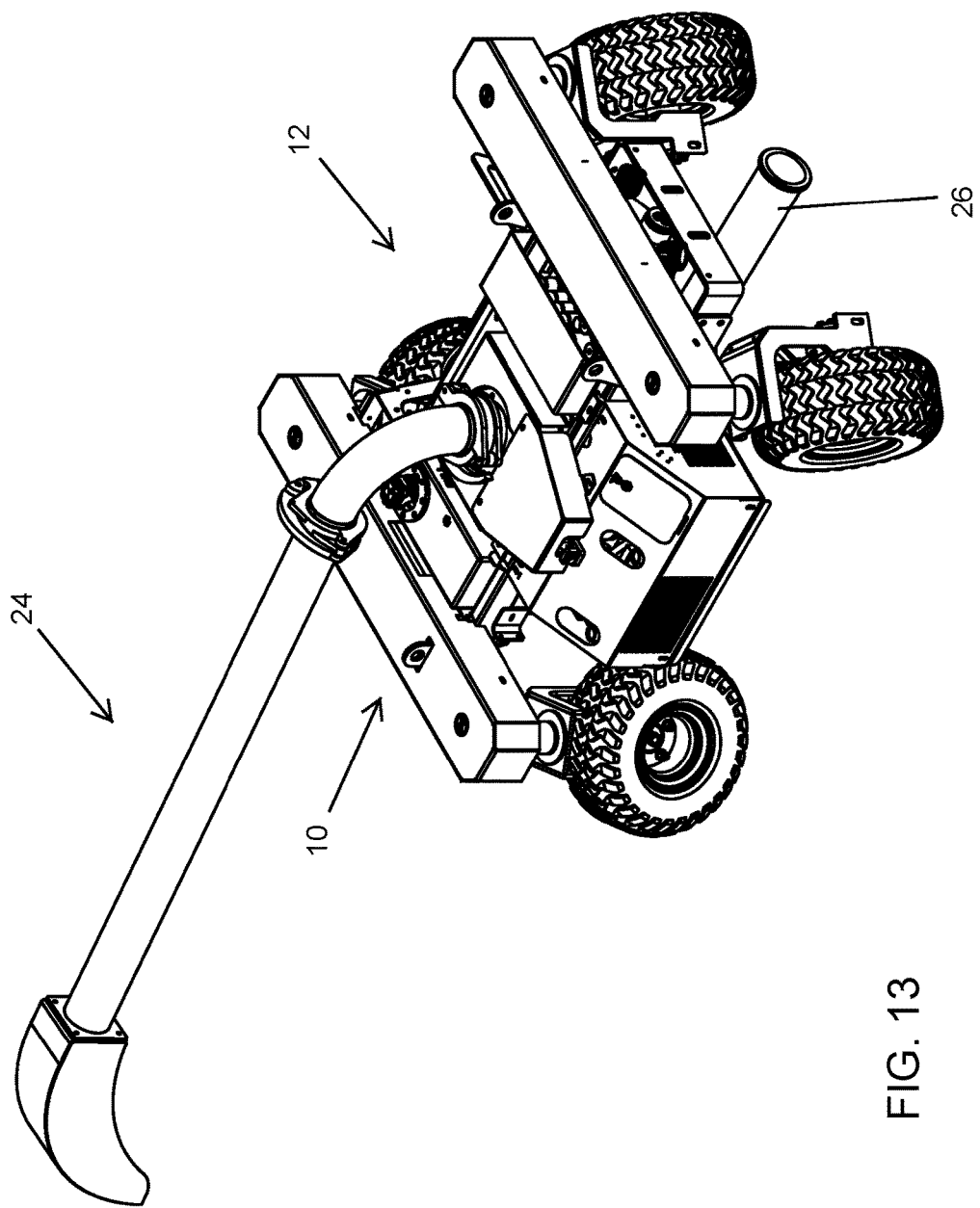
FIG. 13 is a perspective view of a wheeled hose moving device and concrete placing device in accordance with the present invention, shown supporting a section of hose, and shown in a four wheel steering mode, with the front and rear wheels used for steering.
Figure 14:
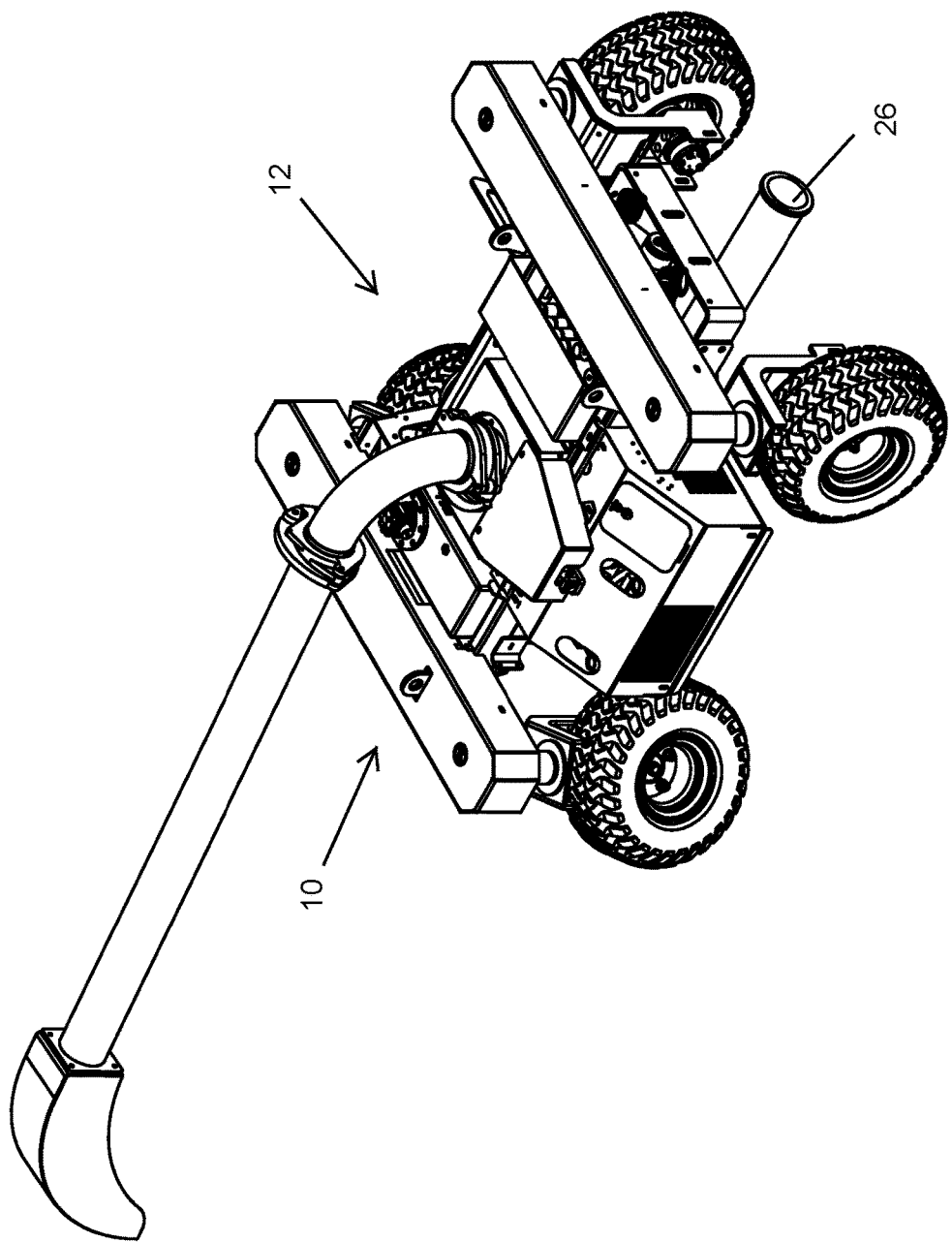
FIG. 14 is another perspective view of the wheeled hose moving device and concrete placing device of FIG. 13, shown in a two wheel steering mode, with the front wheels (or rear wheels) used for steering and the other wheels held in a straight or non-steering mode.
Figure 15:
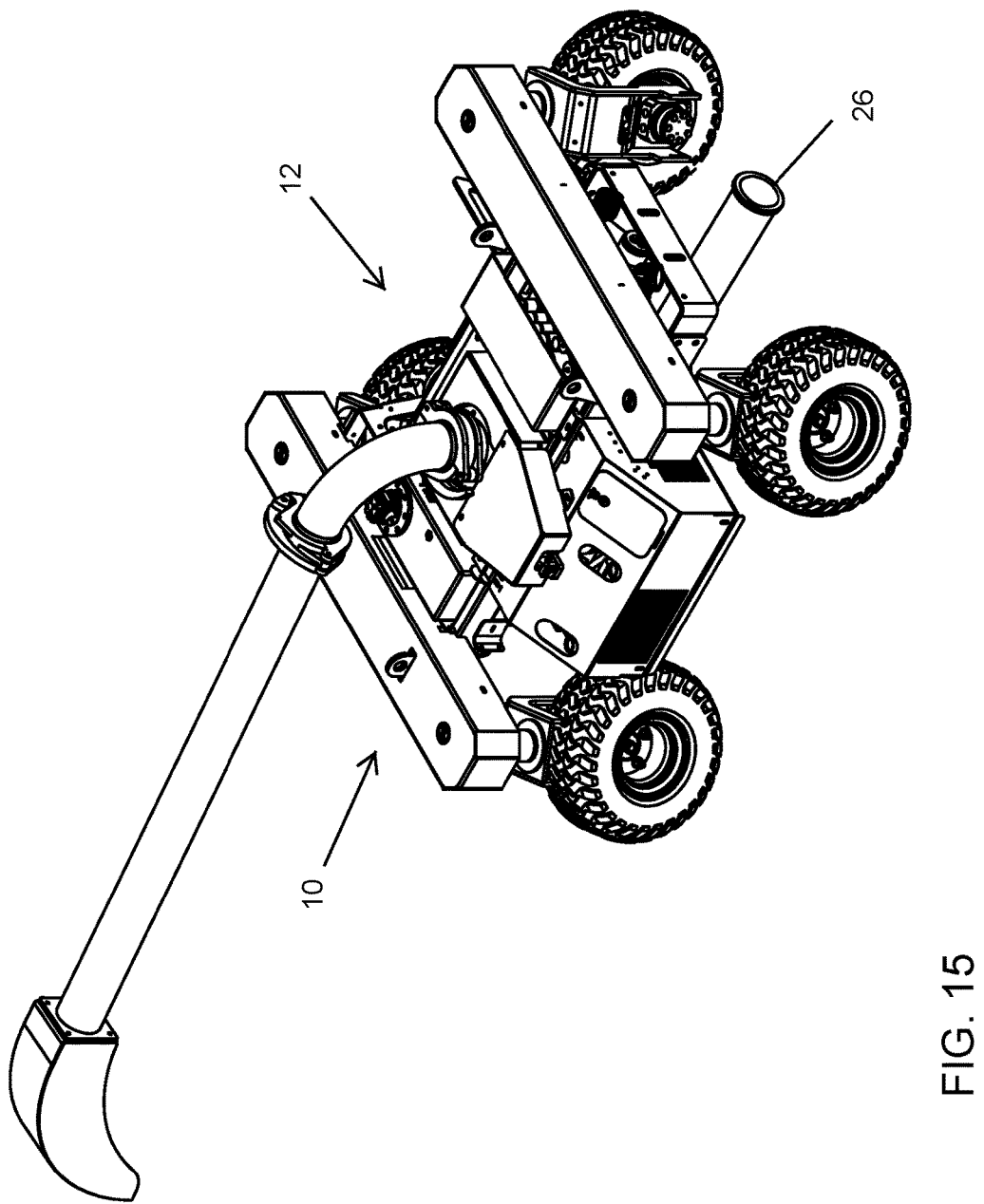
FIG. 15 is a perspective view of the wheeled hose moving device and concrete placing device of FIG. 13, shown in a crab steering mode, with the front and rear wheels used for steering.

As shown in FIGS. 1, 11 and 12, the wheeled support unit may operate to lift and move a hose or section of hose at a support surface. Optionally, the wheeled support device or unit may include a concrete placing hose or discharge tube 24 or the like, such as shown in FIGS. 13-15. The concrete placing device includes a hose connecting portion 26 at the wheeled support that is configured to connect to a concrete supply hose to supply uncured concrete to the wheeled device, whereby the supplied uncured concrete is placed at the support surface by the concrete placing hose or discharge tube as the wheeled device is moved over the support surface. The concrete placing hose or discharge tube may be pivotable about a generally vertical axis at the wheeled support or may be fixedly mounted at the wheeled support.

The same base machine design is used for both the hose puller (hose grapple) and the placer. The machine can be equipped with the rotating discharge chute or the hose clamp/grapple or hose grasping and support apparatus. Both machines use the same hydraulic manifold block to control all functions. The manifold block is populated with different valves or plugs in order to configure it for use on either the puller (hose lifting and moving device) or the placer (concrete placing device).

There are three steering modes (two wheel steering, four wheel steering and crab steering). These are user selectable from the remote control. In the crab steering mode, the steering can articulate up to 90 degrees to either the left or right. In the two wheel steering and four wheel steering modes, the steering is intelligently limited to eliminate tire scrub and possible "skid-steering" (i.e., the tires/wheels cannot be steered so that the wheels of one set at the front or rear of the support are oriented perpendicular to the wheels of the other set of wheels at the opposite end of the support). The remote control is equipped with a steering "return to center" switch. Pushing this switch automatically returns the front wheels to the center or straight position or orientation. If the crab steering mode or the four wheel steering mode is active, the rear wheels will also return to the center or straight position or orientation.

The hose grapple or support elements or mechanism is driven by linkages and is actuated by the same hydraulic cylinder that raises and lowers the clamping or grasping device. The linkage delays the support element closing action so that the hose is lifted off the ground before the grapple arms or support arms swing underneath the raised hose to provide support.

The hose grasping and raising/lowering operation can be controlled via a switch on the machine or via the remote control. Optionally, the machine may not provide remote function of the clamp open/close. Optionally, the machine may provide remote function of the opening and closing of the grasping device or clamp, such as via use of digital outputs from the radio receiver that could be utilized to add this functionality. For such an application, the remote control may include another switch or may include a dual axis joystick, such that both the open/close and raise/lower functions could be operated remotely.

Therefore, the present invention provides a hose moving device or machine that is operable to grasp and lift and support a hose or section of hose for moving the hose at a concrete placing site. The support elements at opposite ends of the machine are opened and closed via mechanical linkage with the central grasping device, such that actuation of a single actuator can raise a grasped hose and can close the support elements at the raised hose to support the hose at the machine or unit.

Changes and modifications in the specifically described embodiments may be carried out without departing from the principles of the present invention, which is intended to be limited only by the scope of the appended claims, as interpreted according to the principles of patent law.

The invention claimed is:

1. A wheeled hose moving device that is movable over a support surface and that is operable to grasp, lift and move a concrete supply hose at the support surface, said wheeled hose moving device comprising:
   a wheeled support, said wheeled support including a frame portion and wheels rotatably mounted at said frame portion;
   a hose grasping device at said wheeled support, wherein said hose grasping device is vertically movable between a raised position and a lowered position via an actuator, and wherein said hose grasping device comprises a pair of grasping arms that pivot relative to one another between an opened state and a closed state;
   at least one hose support element that comprises a pair of support arms that pivot relative to one another between an opened state and a closed state, wherein said support arms of said at least one hose support element are linked to said hose grasping device and are automatically pivoted responsive to movement of said hose grasping device;
   wherein said wheeled support is positionable at a concrete supply hose and wherein, via actuation of said actuator, said hose grasping device is lowerable to a level at the concrete supply hose, and wherein, when said hose grasping device is lowered toward the level at the concrete supply hose, said pair of grasping arms of said hose grasping device and said pair of support arms of said at least one hose support element are in the opened state;
   wherein, when said hose grasping device is lowered to be at the concrete supply hose, said grasping arms of said hose grasping device are moved toward the closed state to engage and grasp the concrete supply hose; and
   wherein, when said grasping arms of said hose grasping device are in the closed state and grasp the concrete supply hose, said hose grasping device is raised via actuation of said actuator to lift the grasped concrete supply hose, and wherein, responsive to said hose grasping device being raised, said pair of support arms of said at least one hose support element are automatically moved toward the closed state to at least partially close below the raised concrete supply hose to support the raised concrete supply hose, whereby the grasped and lifted and supported concrete supply hose is movable over the support surface by said wheeled support.

2. The wheeled hose moving device of claim 1, wherein, responsive to said hose grasping device being lowered, said pair of support arms of said at least one hose support element are automatically moved toward the opened state.

3. The wheeled hose moving device of claim 1, wherein said hose grasping device is selectively vertically movable via said actuator, and wherein said actuator comprises a vertically oriented actuator.

4. The wheeled hose moving device of claim 3, wherein said grasping arms of said hose grasping device are moved relative to one another via another actuator.

5. The wheeled hose moving device of claim 1, wherein said grasping arms of said hose grasping device comprise oppositely curved grasping elements that grasp a cylindrical hose when in the closed state.

6. The wheeled hose moving device of claim 1, wherein said at least one hose support element is spaced from said hose grasping device and is disposed at an end region of said wheeled support.

7. The wheeled hose moving device of claim 6, wherein said hose grasping device is centrally located at said wheeled support, and wherein said at least one hose support element comprises two hose support elements, one at each end region of said wheeled support at opposite sides from said hose grasping device.

8. The wheeled hose moving device of claim 1, wherein said wheels of said wheeled support are pivotable about respective vertical axes to steer said wheeled support over the support surface.

9. The wheeled hose moving device of claim 8, wherein said wheels are selectively pivoted about the vertical axes to selectively provide one of (i) a two wheel steering mode, (ii) a four wheel steering mode and (iii) a crab steering mode.

10. The wheeled hose moving device of claim 9, wherein, responsive to a user input, said wheels are returned to a straight position or a center position.

11. A wheeled hose moving device that is movable over a support surface and that is operable to grasp, lift and move a concrete supply hose at the support surface, said wheeled hose moving device comprising:
    a wheeled support, said wheeled support including a frame portion and wheels rotatably mounted at said frame portion;
    a hose grasping device at said wheeled support, wherein said hose grasping device is vertically movable between a raised position and a lowered position via an actuator, and wherein said hose grasping device comprises a pair of grasping arms that pivot relative to one another between an opened state and a closed state;
    at least one hose support element that comprises a pair of support arms that pivot relative to one another between an opened state and a closed state, wherein said pair of support arms of said at least one hose support element are pivoted responsive to movement of said hose grasping device;
    wherein said wheeled support is positionable at a concrete supply hose and said hose grasping device is lowerable to a level at the concrete supply hose, and wherein, when said hose grasping device is lowered toward the level at the concrete supply hose, said pair of grasping arms of said hose grasping device and said pair of support arms of said at least one hose support element are in the opened state;
    wherein, when said hose grasping device is lowered to be at the concrete supply hose, said grasping arms of said hose grasping device are moved toward the closed state to engage and grasp the concrete supply hose;
    wherein, when said grasping arms of said hose grasping device are in the closed state and grasp the concrete supply hose, said hose grasping device is raised to lift the grasped concrete supply hose, and wherein, responsive to said hose grasping device being raised, said pair of support arms of said at least one hose support element are moved toward the closed state to at least partially close below the raised concrete supply hose to support the raised concrete supply hose, whereby the grasped and lifted and supported concrete supply hose is movable over the support surface by said wheeled support; and wherein each said support arm of said at least one hose support element is mechanically linked to said hose grasping device so that said support arms move responsive to vertical movement of said hose grasping device.

12. The wheeled hose moving device of claim 11, wherein each said support arm of said at least one hose support element is mechanically linked to said hose grasping device via an elongated member and a pair of linkages that cooperate to rotate and move said elongated member responsive to vertical movement of said hose grasping device.

13. A The wheeled hose moving device that is movable over a support surface and that is operable to grasp, lift and move a concrete supply hose at the support surface, said wheeled hose moving device comprising:

a wheeled support, said wheeled support including a frame portion and wheels rotatably mounted at said frame portion;

a hose grasping device at said wheeled support, wherein said hose grasping device is vertically movable between a raised position and a lowered position via an actuator, and wherein said hose grasping device comprises a pair of grasping arms that pivot relative to one another between an opened state and a closed state;

at least one hose support element that comprises a pair of support arms that pivot relative to one another between an opened state and a closed state, wherein said pair of support arms of said at least one hose support element are pivoted responsive to movement of said hose grasping device;

wherein said wheeled support is positionable at a concrete supply hose and said hose grasping device is lowerable to a level at the concrete supply hose, and wherein, when said hose grasping device is lowered toward the level at the concrete supply hose, said pair of grasping arms of said hose grasping device and said pair of support arms of said at least one hose support element are in the opened state;

wherein, when said hose grasping device is lowered to be at the concrete supply hose, said grasping arms of said hose grasping device are moved toward the closed state to engage and grasp the concrete supply hose;

wherein, when said grasping arms of said hose grasping device are in the closed state and grasp the concrete supply hose, said hose grasping device is raised to lift the grasped concrete supply hose, and wherein, responsive to said hose grasping device being raised, said pair of support arms of said at least one hose support element are moved toward the closed state to at least partially close below the raised concrete supply hose to support the raised concrete supply hose, whereby the grasped and lifted and supported concrete supply hose is movable over the support surface by said wheeled support;

wherein said at least one hose support element is spaced from said hose grasping device and is disposed at an end region of said wheeled support;

wherein said hose grasping device is centrally located at said wheeled support, and wherein said at least one hose support element comprises two hose support elements, one at each end region of said wheeled support at opposite sides from said hose grasping device; and wherein each said support arm of said hose support elements is attached at a respective elongated member that is mechanically linked to said hose grasping device via a pair of linkages that cooperate to rotate and move said elongated member and said support arms of said hose support elements responsive to vertical movement of said hose grasping device.

14. The wheeled hose moving device of claim 13, wherein each said pair of linkages comprises a first link and a second link pivotally attached at said first link, and wherein said first link is pivotally attached at said hose grasping device and said second link is fixedly attached at the respective elongated member, and wherein vertical movement of said hose grasping device pivots said first links and said second links and causes said elongated members to pivot.

15. The wheeled hose moving device of claim 14, wherein each of said elongated members is pivotally attached at said wheeled support via a bracket such that the brackets pivot about a pivot axis that is spaced from a longitudinal axis of said elongated members so as to swing and pivot said elongated members responsive to vertical movement of said hose grasping device.

16. A method for grasping, lifting and moving a concrete supply hose via a wheeled hose moving device, said method comprising:

providing a wheeled support, wherein the wheeled support comprises a frame portion and wheels rotatably mounted at the frame portion, and wherein the wheeled support comprises a hose grasping device and a hose support element, and wherein the hose grasping device comprises a pair of grasping arms that are movable relative to one another between an opened state and a closed state, and wherein the hose support element comprises a pair of support arms that are movable relative to one another between an opened state and a closed state;

positioning the wheeled support at a concrete supply hose;

moving the hose grasping device vertically from a raised position toward a lowered position via an actuator;

when the hose grasping device is lowered to the lowered position so as to be at the concrete supply hose, pivoting the grasping arms of the hose grasping device relative to one another from their opened state toward their closed state to grasp the concrete supply hose;

when the grasping arms of the hose grasping device are in the closed state and grasping the concrete supply hose, raising the hose grasping device via the actuator to lift the grasped concrete supply hose via the hose grasping device;

responsive to raising the hose grasping device via the actuator, automatically moving the support arms of the hose support element toward their closed state to at least partially close below the raised concrete supply hose to support the raised concrete supply hose above a support surface; and moving the wheeled support to move the grasped and lifted and supported concrete supply hose over the support surface.

17. The method of claim 16, comprising lowering the hose grasping device and the grasped and lifted and supported concrete supply hose, and, responsive to lowering the hose grasping device, moving the support arms of the hose support element toward their opened state to release the concrete supply hose.

18. The method of claim 16, wherein the actuator that moves the hose grasping device comprises a first actuator, and wherein the first actuator comprises a vertically oriented actuator.

19. The method of claim 18, wherein moving the grasping arms of the hose grasping device relative to one another comprises moving the grasping arms via a second actuator.

20. The method of claim 16, wherein the wheeled support comprises a first hose support element spaced from the hose grasping device and located toward one end of the wheeled support and a second hose support element spaced from the hose grasping device and located toward another end of the wheeled support.

21. A method for grasping, lifting and moving a concrete supply hose via a wheeled hose moving device, said method comprising:
    providing a wheeled support, wherein the wheeled support comprises a frame portion and wheels rotatably mounted at the frame portion, and wherein the wheeled support comprises a hose grasping device and a hose support element, and wherein the hose grasping device comprises a pair of grasping arms that are movable relative to one another between an opened state and a closed state, and wherein the hose support element comprises a pair of support arms that are movable relative to one another between an opened state and a closed state;
    positioning the wheeled support at a concrete supply hose;
    moving the hose grasping device vertically from a raised position toward a lowered position via an actuator;
    when the hose grasping device is lowered to the lowered position so as to be at the concrete supply hose, pivoting the grasping arms of the hose grasping device relative to one another from their opened state toward their closed state to grasp the concrete supply hose;
    when the grasping arms of the hose grasping device are in the closed state and grasping the concrete supply hose, raising the hose grasping device to lift the grasped concrete supply hose via the hose grasping device;
    responsive to raising the hose grasping device, moving the support arms of the hose support element toward their closed state to at least partially close below the raised concrete supply hose to support the raised concrete supply hose above a support surface;
    moving the wheeled support to move the grasped and lifted and supported concrete supply hose over the support surface; and
    wherein the support arms are mechanically linked to the hose grasping device, and wherein said method comprises moving the support arms toward their opened state via linkages that cooperate to move the support arms toward their opened state responsive to downward movement of the hose grasping device and to move the support arms toward their closed state responsive to upward movement of the hose grasping device.

22. A wheeled concrete hose moving or concrete placing device that is movable over a support surface and that is operable to move a concrete supply hose at the support surface or place concrete at the support surface, said wheeled device comprising:
    a wheeled support, said wheeled support including a frame portion and wheels rotatably mounted at said frame portion;
    wherein said wheels of said wheeled support comprise a first set of wheels at one end of the wheeled support and a second set of wheels at the other end of the wheeled support;
    wherein said wheels are pivotable about respective vertical axes to steer said wheeled support over the support surface;
    wherein said wheels of said first set of wheels are pivoted together about the respective vertical axes and wherein said wheels of said second set of wheels are pivoted together about the respective vertical axes;
    wherein said wheels are selectively pivoted about the vertical axes to provide one of (i) a two wheel steering mode, (ii) a four wheel steering mode and (iii) a crab steering mode; and
    wherein, during steering of said wheeled support, said wheeled device limits pivoting of said wheels about their respective axes so that said wheels of said first set of wheels cannot pivot so as to be oriented perpendicular to said wheels of said second set of wheels.

23. The wheeled device of claim 22, wherein, after pivoting at least some of said wheels to steer said movable device and responsive to actuation of a user input, said wheels are returned to a straight position.

24. The wheeled device of claim 23, wherein said wheels are returned to the straight position responsive to actuation of a user input of a remote control.

25. The wheeled device of claim 24, wherein, when said wheeled device is operating in the two wheel steering mode, said first set of wheels return to the straight position responsive to actuation of the user input of the remote control.

26. The wheeled device of claim 24, wherein, when said wheeled device is operating in the four wheel steering mode or the crab wheel steering mode, said first set of wheels and said second set of wheels return to the straight position responsive to actuation of the user input of the remote control.

27. The wheeled device of claim 22, wherein said wheeled device limits pivoting of said wheels about their respective axes so that said wheels of said first set of wheels cannot pivot so as to be oriented perpendicular to said wheels of said second set of wheels at least when operating in the two wheel steering mode or the four wheel steering mode.

28. The wheeled device of claim 22, wherein said wheeled device is operable to grasp, lift and move a concrete supply hose at the support surface, and wherein said wheeled device comprises a hose grasping device at said wheeled support, and wherein said hose grasping device is vertically movable between a raised position and a lowered position via an actuator, and wherein said hose grasping device comprises a pair of grasping arms that pivot relative to one another between an opened state and a closed state.

29. The wheeled device of claim 22, wherein said wheeled device is operable to place uncured concrete at the support surface, and wherein said wheeled device comprises a hose connecting portion that connects to a concrete supply hose and a concrete placing structure that extends from an upper portion of said wheeled support and functions to place concrete supplied from the concrete supply hose at the support surface.

* * * * *

UNITED STATES PATENT AND TRADEMARK OFFICE
CERTIFICATE OF CORRECTION

PATENT NO. : 10,443,251 B2  
APPLICATION NO. : 15/787837  
DATED : October 15, 2019  
INVENTOR(S) : Trevor Eenigenburg et al.

Page 1 of 1

It is certified that error appears in the above-identified patent and that said Letters Patent is hereby corrected as shown below:

In the Claims

Column 9  
Line 14, Claim 13, "A The wheeled" should be --A wheeled--

Signed and Sealed this  
Twelfth Day of November, 2019

Andrei Iancu  
*Director of the United States Patent and Trademark Office*